United States Patent
Wang

(10) Patent No.: US 10,684,529 B2
(45) Date of Patent: Jun. 16, 2020

(54) DISPLAY PANEL, METHOD FOR ADJUSTING GRAYSCALE OF THE SAME, AND DISPLAY DEVICE

(71) Applicant: BOE TECHNOLOGY GROUP CO., LTD., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/119,675

(22) Filed: Aug. 31, 2018

(65) Prior Publication Data

US 2019/0278152 A1 Sep. 12, 2019

(30) Foreign Application Priority Data

Mar. 12, 2018 (CN) .......................... 2018 1 0201792

(51) Int. Cl.
*G02F 1/29* (2006.01)
*G02F 1/1335* (2006.01)

(52) U.S. Cl.
CPC .......... *G02F 1/29* (2013.01); *G02F 1/133526* (2013.01); *G02F 2203/30* (2013.01)

(58) Field of Classification Search
CPC .. G02F 2203/30; G02F 1/29; G02F 1/133526; G02B 27/0955; H01L 51/5275
See application file for complete search history.

(56) References Cited

U.S. PATENT DOCUMENTS

| | | | |
|---|---|---|---|
| 2013/0208196 A1* | 8/2013 | Kim | G02F 1/134309 349/15 |
| 2014/0055716 A1* | 2/2014 | Zhang | G02F 1/133512 349/64 |
| 2015/0022758 A1 | 1/2015 | Hwang et al. | |

(Continued)

FOREIGN PATENT DOCUMENTS

| CN | 103543552 A | 1/2014 |
|---|---|---|
| CN | 103676171 A | 3/2014 |

(Continued)

OTHER PUBLICATIONS

First Chinese Office Action dated Apr. 17, 2020, received for corresponding Chinese Application No. 201810201792.7, 23 pages.

*Primary Examiner* — Michael H Caley
*Assistant Examiner* — Mariam Qureshi
(74) *Attorney, Agent, or Firm* — Kinney & Lange, P.A.

(57) ABSTRACT

A display panel, a method for adjusting a grayscale of the display panel, and a display device are disclosed. The display panel includes: a first substrate and a second substrate opposite thereto, and a liquid crystal layer therebetween. At least a first electrode assembly is provided on a surface of the first substrate facing towards the liquid crystal layer, and is configured to drive liquid crystal molecules in a first region of the liquid crystal layer abutting against the first electrode assembly to deflect to form a first lens having a first refractive-index distribution, and at least a second electrode assembly is provided on a surface of the second substrate facing towards the liquid crystal layer, and configured to drive liquid crystal molecules in a second region of the liquid crystal layer abutting against the second electrode assembly to deflect to form a second lens having a second refractive-index distribution.

20 Claims, 7 Drawing Sheets

(56) References Cited

U.S. PATENT DOCUMENTS

2017/0171540 A1* 6/2017 Li ..................... G02F 1/1333
2018/0196255 A1   7/2018 Liu et al.

FOREIGN PATENT DOCUMENTS

| CN | 105842907 A | 8/2016 |
| CN | 106292123 A | 1/2017 |
| CN | 106647064 A | 5/2017 |

* cited by examiner

DISPLAY PANEL, METHOD FOR ADJUSTING GRAYSCALE OF THE SAME, AND DISPLAY DEVICE

CROSS-REFERENCE TO RELATED APPLICATION

The present application claims the benefit of Chinese Patent Application Invention No. 201810201792.7 filed on Mar. 12, 2018 in the State Intellectual Property Office of China, the whole disclosure of which is incorporated herein by reference.

BACKGROUND

Technical Field

Embodiments of the present disclosure relate to the field of display technology, and especially to a display panel, a method for adjusting a grayscale of the same, and a display device.

Description of the Related Art

In a relevant LCD structure, when a light of a backlight module is incident on a structure of each layer, there is an optical loss; especially in a condition that the light passes through two polarizers arranged sequentially in vertical direction, optical energy thereof may be at a great loss, such that a resulting light transmittance Tr of merely approximately 5%.

Therefore, a more in-depth and thorough research on improvement of a light utilization efficiency of a display panel is required.

SUMMARY

The embodiments of the present disclosure have been made to overcome or alleviate at least one aspect of the above mentioned disadvantages and/or shortcomings in the prior art, by providing a display panel, a method for adjusting a grayscale of the same, and a display device.

Following technical solutions are adopted in exemplary embodiments of the invention for achieving the above desired technical purposes.

According to an aspect of the exemplary embodiment of the present disclosure, there is provided a display panel, comprising: a first substrate and a second substrate provided opposite to each other; a liquid crystal layer between the first substrate and the second substrate; wherein the display panel further comprises: at least a first electrode assembly, on a surface of the first substrate facing towards the liquid crystal layer, and configured to drive liquid crystal molecules in a first region of the liquid crystal layer abutting against the first electrode assembly to deflect to form a first equivalent liquid crystal lens having a first refractive-index distribution, the first equivalent liquid crystal lens having the same equivalent curvature, width, thickness, orthogonal projection and focus as those of a physical lens which also has the first refractive-index distribution and projects in a direction away from the first substrate; and at least a second electrode assembly, on a surface of the second substrate facing towards the liquid crystal layer, and configured to drive liquid crystal molecules in a second region of the liquid crystal layer abutting against the second electrode assembly to deflect to form a second equivalent liquid crystal lens having a second refractive-index distribution, the second equivalent liquid crystal lens having the same equivalent curvature, width, thickness, orthogonal projection and focus as those of another physical lens which also has the second refractive-index distribution and projects in a direction away from the second substrate; and an equivalent orthographic projection of the second equivalent liquid crystal lens covers an equivalent orthographic projection of the first equivalent liquid crystal lens, on the first substrate, and an equivalent width of the first equivalent liquid crystal lens is smaller than that of the second equivalent liquid crystal lens.

According to an embodiment of the disclosure, the first region is a rectangular region abutting against a side of the first electrode assembly facing towards the second electrode assembly, within the liquid crystal layer; and the second region is another rectangular region abutting against a side of the second electrode assembly facing towards the first electrode assembly, within the liquid crystal layer; and a width of the first region is set to be 1.2 times of a width of the first electrode assembly, and a width of the second region is set to be 1.2 times of a width of the second electrode assembly, and respective thickness each of the first region and the second region is set to be ½ of a thickness of the liquid crystal layer.

According to an embodiment of the disclosure, a principal optical axis of the first equivalent liquid crystal lens and a principal optical axis of the second equivalent liquid crystal lens are arranged on one and the same straight line.

According to an embodiment of the disclosure, a focal point of the first equivalent liquid crystal lens and a focal point of the second equivalent liquid crystal lens coincide with each other.

According to an embodiment of the disclosure, a principal optical axis of the first equivalent liquid crystal lens and a principal optical axis of the second equivalent liquid crystal lens are perpendicular to the first substrate and the second substrate, respectively.

According to an embodiment of the disclosure, each of the first equivalent liquid crystal lens and the second equivalent liquid crystal lens is arranged symmetrically along respective principal optical axis, individually.

According to an embodiment of the disclosure, the display panel as above further comprises: a color film layer between the second substrate and the second electrode assembly, the color film layer comprising: a black matrix defining a plurality of second openings spaced apart from one another; and a plurality of color filters spaced apart from one another and alternating between adjacent ones of the plurality of second openings, respectively; at least one sub-black matrix is interposed within each of the plurality of color filters, dividing each of the plurality of color filters into an even number of sub-color filters having an identical color; and an equivalent orthographic projection of the second equivalent liquid crystal lens on the second substrate covers an even number of sub-color filters having an identical color in each of the plurality of color filters.

According to an embodiment of the disclosure, the display panel as above further comprises: collimators in a bar shape, in a region on one of a surface of the first substrate facing towards the liquid crystal layer and a surface of the first substrate facing away from the liquid crystal layer, the region being in alignment with the first electrode assembly or the first equivalent liquid crystal lens in a direction of a principal optical axis of the first equivalent liquid crystal lens; and one of the at least one sub-black matrix functions as a central black matrix which is most centrally located therein, in the middle of the even number of sub-color filters, and an orthographic projection of the central black matrix covers orthographic projections of the collimators on the first substrate.

According to an embodiment of the disclosure, there are an odd number of the plurality of second sub-electrodes and also an odd number of the plurality of fourth sub-electrodes, respectively.

According to an embodiment of the disclosure, the third sub-electrode is provided with at least one first opening, and an orthographic projection of a fourth central electrode which functions as a middlemost one of the plurality of fourth sub-electrodes covers an orthographic projection of the first opening on the second substrate; and in response to voltages being applied respectively to the third sub-electrode and the plurality of fourth sub-electrodes of the second electrode assembly, an edge electric field is formed between others of the plurality of fourth sub-electrodes which are located nearest to the fourth central electrode at both sides thereof and edges of the third sub-electrode defining the first opening.

According to an embodiment of the disclosure, a width of the first opening is $\frac{1}{10}$ to $\frac{4}{5}$ of a width of the fourth central electrode.

According to an embodiment of the disclosure, one of the at least one sub-black matrix functions as a central black matrix which is most centrally located therein, in the middle of the even number of sub-color filters, and an orthographic projection of the central black matrix covers orthographic projections of the collimators on the first substrate.

According to an embodiment of the disclosure, an equivalent width of the second equivalent liquid crystal lens is 3 to 6 times of an equivalent width of the first equivalent liquid crystal lens.

According to another aspect of the exemplary embodiment of the present disclosure, there is further provided a display device comprising: the display panel as above, and a housing inside which the display panel is accommodated.

According to still another aspect of the exemplary embodiment of the present disclosure, there is further provided a method for adjusting a grayscale of the display panel as above, by adjusting a curvature of at least one of the first equivalent liquid crystal lens and the second equivalent liquid crystal lens, specifically comprising: applying voltages on the first electrode assembly and the second electrode assembly to induce an increase in equivalent curvature of at least one of the first equivalent liquid crystal lens and the second equivalent liquid crystal lens in response to an ascending change of the grayscale of the display panel, with the focal point of the first equivalent liquid crystal lens being maintained in coincidence with the focal point of the second equivalent liquid crystal lens; and to induce a decrease in equivalent curvature of at least one of the first equivalent liquid crystal lens and the second equivalent liquid crystal lens in response to a descending change of the grayscale of the display panel, with the focal point of the first equivalent liquid crystal lens being maintained in coincidence with the focal point of the second equivalent liquid crystal lens.

According to an embodiment of the disclosure, a voltage of a second central electrode which functions as a middlemost one of the plurality of second sub-electrodes is equal to a voltage of the first sub-electrode, and a voltage of a fourth central electrode which functions as a middlemost one of the plurality of fourth sub-electrodes is equal to a voltage of the third sub-electrode, and voltages of the plurality of second sub-electrodes and voltages of the plurality of fourth sub-electrodes increase sequentially from the middle to both sides, respectively; and an increase margin in which the voltages of the plurality of second sub-electrodes and/or the plurality of fourth sub-electrodes increase sequentially from the middle to both sides becomes larger gradually, in response to the an ascending change of the grayscale of the display panel; and the increase margin in which the voltages of the plurality of second sub-electrodes and/or the plurality of fourth sub-electrodes increase sequentially from the middle to both sides becomes smaller gradually, in response to the descending change of the grayscale of the display panel.

According to an embodiment of the disclosure, the respective equivalent width of at least one of the first equivalent liquid crystal lens and the second equivalent liquid crystal lens is adjusted, and the respective equivalent curvature of at least one of the first equivalent liquid crystal lens and the equivalent liquid crystal second equivalent liquid crystal lens is also adjusted, with the focal points of the first equivalent liquid crystal lens and the second equivalent liquid crystal lens being maintained unchanged, and adjustments of both the respective equivalent width and the respective equivalent curvature are implemented by adjusting respective voltage value of at least one of the first electrode assembly and the second electrode assembly.

According to an embodiment of the disclosure, only equivalent curvatures of both the first equivalent liquid crystal lens and the second equivalent liquid crystal lens are adjusted, with equivalent widths of both the first equivalent liquid crystal lens and the second equivalent liquid crystal lens being maintained unchanged, such that in response to a change in at least one of the equivalent curvatures of the first equivalent liquid crystal lens and the second equivalent liquid crystal lens, at least one of the respective equivalent focal points of the first equivalent liquid crystal lens and the second equivalent liquid crystal lens moves in respective principal optical axis, with equivalent focal points of both the first equivalent liquid crystal lens and the second equivalent liquid crystal lens still being maintained in coincidence with each other.

According to an embodiment of the disclosure, a voltage of the second central electrode is equal to that of the fourth central electrode.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS

Figure 1:
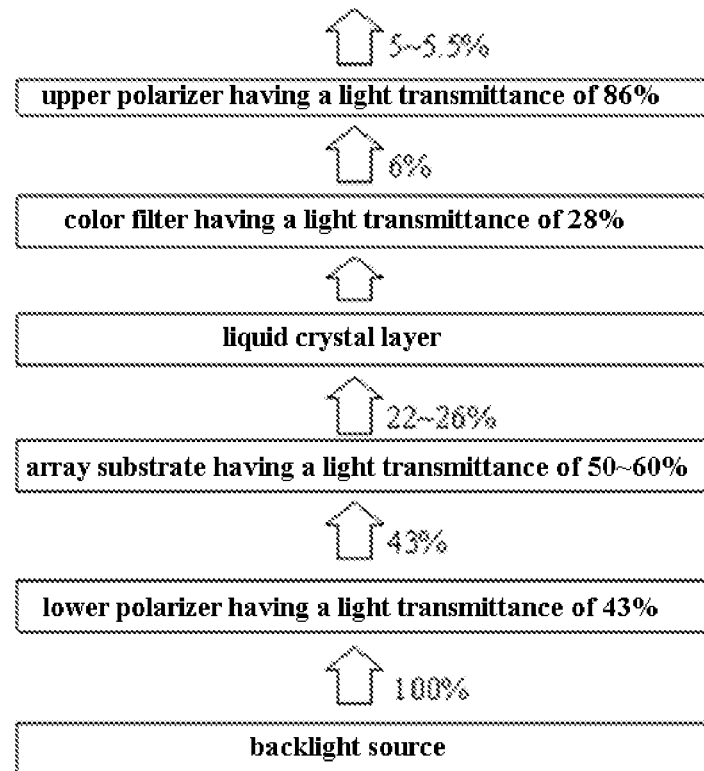
FIG. 1 illustrates a schematic view of light transmittances of various structures in a display panel in a relevant art.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In case that there is no specific technology or applicable condition being specified in embodiments, then operations may be carried out according to technologies or conditions as described in documents in the relevant art, or depending on a product specification. As to reagents or instruments as used whose manufacturers/vendors are not specified/indicated thereon, such reagents or instruments may be relevant products which are commercially available.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A general technical concept of embodiments of the present disclosure may be obtained on the basis of following understanding and founding:

It has been found that, a structure of each layer of a LCD display panel may cause a partial loss of light, which may finally result in that a light transmittance Tr of the display panel may be merely approximately 5.5%. Referring to FIG. 1, a lower polarizer (POL), an upper polarizer and a color filter film (CF) have relatively low light transmittances of 43%, 86% and 28% respectively. Based on above conditions, the inventor conducts a research on the polarizers and desires to obtain an alternative method which may be used to adjust a grayscale of the display panel without a polarizer. And it is found by the inventor that, the grayscale of the display panel may be adjusted by providing electrode assembles on two opposite sides disposed opposing to each other and by forming two lenses with liquid crystal molecules by use of the electrode assemblies, the two lenses cooperating with each other instead of the polarizer(s) to adjust the grayscale of the display panel. In other words, it is not required to provide polarizer(s) in the LCD structure. Therefore, the light utilization efficiency may be enhanced.

Figure 2:
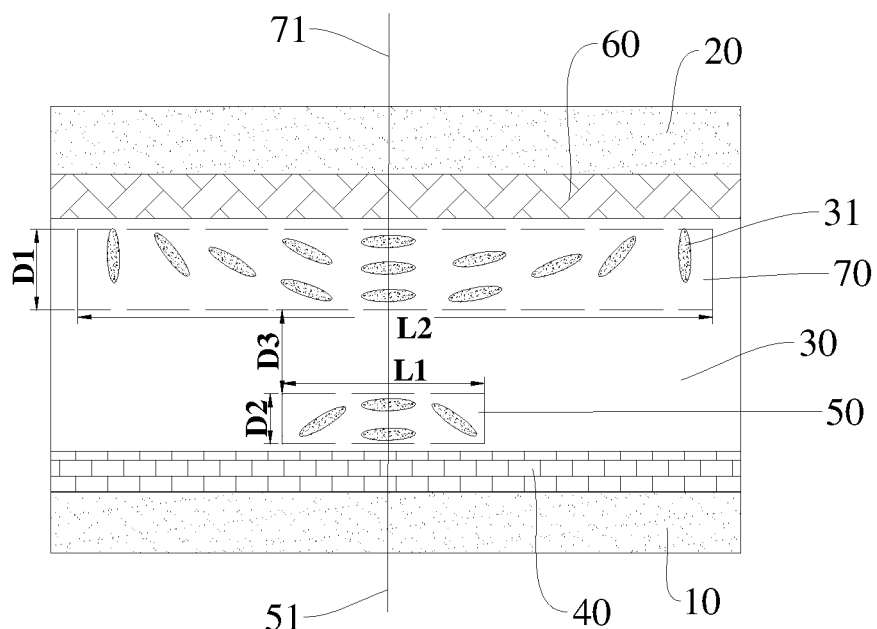
FIG. 2 illustrates a structural schematic view of a display panel according to an embodiment of the disclosure.

On the basis of a general technical concept of embodiments of the present disclosure, according to an aspect of the embodiments of the disclosure, there is provided a display panel according to an embodiment of the disclosure, as illustrated in FIG. 2, comprising: a first substrate 10 and a second substrate 20 provided opposite to each other; a liquid crystal layer 30 interposed between the first substrate 10 and the second substrate 20; and the display panel further comprises: at least a first electrode assembly 40, which is provided on a surface of the first substrate 10 facing towards the liquid crystal layer 30, and configured to drive liquid crystal molecules in a first region of the liquid crystal layer 30 abutting against the first electrode assembly 40 to deflect so as to form a first equivalent liquid crystal lens 50 having a first refractive-index profile (i.e., refractive-index distribution), the first equivalent liquid crystal lens having the same physical parameters (such as equivalent curvature, width, thickness, orthogonal projection and focus, and the like, but not being limited thereto) as those of a physical lens (i.e., a lens entity) also having the first refractive-index profile and projecting in a direction away from the first substrate 10 towards the liquid crystal layer 30, in response to a voltage being applied on the first electrode assembly; and at least a second electrode assembly 60, which is provided on a surface of the second substrate 20 facing towards the liquid crystal layer 30, and configured to drive liquid crystal molecules 31 in a second region of the liquid crystal layer 30 abutting against the second electrode assembly 60 to deflect so as to form a second equivalent liquid crystal lens 70 having a second refractive-index profile (i.e., refractive-index distribution), the second equivalent liquid crystal lens having the same physical parameters (such as equivalent curvature, width, thickness, orthogonal projection and focus, and the like, but not being limited thereto) as those of another physical lens (i.e., another lens entity) also having the second refractive-index profile and projecting in a direction away from the second substrate 20 towards the liquid crystal layer 30, in response to a voltage being applied on the second electrode assembly; and an equivalent orthographic projection of the second equivalent liquid crystal lens 70 on the first substrate 10 covers an equivalent orthographic projection of the first equivalent liquid crystal lens 50 on the first substrate 10, and an equivalent width L1 of the first equivalent liquid crystal lens 50 is smaller than an equivalent width L2 of the second equivalent liquid crystal lens 70. Thereby, by controlling voltages applied to the first electrode assembly and the second electrode assembly respectively and individually, a control on topography of the first equivalent liquid crystal lens and topography of the second equivalent liquid crystal lens thus formed may be obtained respectively, and then a grayscale in displaying of the display panel may be adjusted in turn by the first equivalent liquid crystal lens and the second equivalent liquid crystal lens instead of relevant polarizer(s), so as to implement a grayscale adjustment without providing any additional polarizer individually, facilitating eliminating influence of the polarizer on the light transmittance, i.e., enhancing the light transmittance in conditions of various grayscale levels of the display panel and improving image quality. Again, since the equivalent orthographic projection of the second equivalent liquid crystal lens 70 on the first substrate 10 covers the equivalent orthographic projection of the first equivalent liquid crystal lens 50 on the first substrate 10, and L1 is smaller than L2, then light rays which are converged by the first equivalent liquid crystal lens may spread completely into the second equivalent liquid crystal lens, resulting in an enhanced light utilization efficiency.

It should be noticed that, according to embodiments of the disclosure, liquid crystal molecules in the liquid crystal layer 30 may for example be blue phase liquid crystal molecules, or rod-like liquid crystal molecules as illustrated, and either type of liquid crystal molecules may change continuously their respective deflection angles of liquid crystal directors, step by step, in response to an action applied by an external electric field, such that surface anchoring forces of liquid crystal molecules and action of the external electric field are balanced with each other so as to keep an overall free energy of the liquid crystal layer at a minimal level. Under the action of the external electric field, the refractive indices of the liquid crystal layer may follow, i.e., be in a form of, a certain spatial distribution. At that time, once incoming light waves pass through the liquid crystal layer, then, in different spatial regions, deflected liquid crystal molecules may have different adjustment effects on a wave front of light, e.g., resulting in that the refractive indices of liquid crystal molecules may be in a form of a lens-like distribution and in turn generally present properties/functionalities equivalent to those of a relevant lens; in other words, an 'equivalent liquid crystal lens' is thus formed. In fact, in a liquid crystal region having a uniform thickness (e,g, liquid crystal regions each being in a form of rectangular shape, as illustrated herein), by applying an external electric field thereon, then, an electrical field in a form of a symmetric parabolic shape having a non-uniform distribution thereof as illustrated schematically herein, may be established, in each of these liquid crystal regions. Upon being driven by the electric field(s), in the liquid crystal layer, liquid crystal molecules at different locations have different deflection angles respectively, such that light rays may travel along different optical paths when they pass through the liquid crystal layer, resulting in a phase delay in a form of a parabolic shape; therefore, a wave front for example in a form of a spherical surface may be formed when the light rays passing through the 'equivalent liquid crystal lens', so as to obtain an effect of light convergence or divergence. Therefore, the equivalent liquid crystal lens may for example be an equivalent convex lens, an equivalent concave lens or an equivalent prism. In other words, a lens entity in a relevant art may for example be a physical lens which is thick in the middle and is thinned gradually towards edges thereof, so as to obtain a phase delay distribution in the form of a parabolic shape, and in turn to obtain a light gathering/converging effect. And the equivalent liquid crystal lens which functions to gather/converge light as above has a uniform thickness, and it essentially implement the light gathering/converging effect by controlling distribution of refractive indices to obtain a phase delay distribution similar to that of a physical lens.

And as to determination of the physical parameters (comprising parameters such as equivalent curvature, width, thickness, orthogonal projection and focus, and the like) of the equivalent liquid crystal lens, for example, a laser interference experiment may be implemented, specifically by detecting and observing interference effects when exposed to an one-wavelength laser (i.e., monochromatic laser), then interference fringes may be observed, and a wave-front profile may for example be obtained accordingly; by a schematic view of interference effects and the wave-front profile, then the refractive-index distribution and the phase delay distribution of the liquid crystal molecules may thus be determined accordingly; and an equivalent distribution of refractive indices within the liquid crystal layer may be deduced on the basis of the distribution(s). Therefore, physical parameters of a physical optical lens (e.g., a plano-convex lens) in relevant art having equivalent optical effects to those of aforementioned 'liquid crystal lens', may be considered to be equivalent physical parameters of the 'equivalent liquid crystal lens'; by way of example, then an equivalent size of a radius of curvature radius and equivalent width/aperture size of the 'equivalent liquid crystal lens' may be obtained by conversion.

Choice of a specific type of liquid crystal molecules may not be restricted herein, as long as the equivalent liquid crystal lens may be formed by driving the liquid crystal layer 30. In following embodiments, rod-like liquid crystal molecules are taken as an example, and more thorough interpretation of the embodiments of the disclosure may set forth hereinafter in detail.

According to an embodiment of the disclosure, as illustrated, the first region may for example be a rectangular region abutting against a side of the first electrode assembly facing towards the second electrode assembly, within the liquid crystal layer; and the second region may for example be another rectangular region abutting against a side of the second electrode assembly facing towards the first electrode assembly, within the liquid crystal layer; and by way of example, a width of the first region is set to be 1.2 times of a width of the first electrode assembly, and a width of the second region is set to be 1.2 times of a width of the second electrode assembly, and respective thickness of both the first region and the second region may be set to be ½ of a thickness of the liquid crystal layer, so as to ensure that the first region and the second region may have respective coverage range sufficiently large without overlapping with each other, and without any mutual interference among respective first regions of adjacent first electrode assembles, and without any mutual interference among respective second regions of adjacent second electrode assembles being aligned respectively with the first electrode assembles.

According to an embodiment of the disclosure, since there are no restrictive requirements on specific types of the first substrate and the second substrate, and those skilled in the art may make choice on specific types of the first substrate and the second substrate as per practical requirements. In an embodiment of the disclosure, the specific types of material(s) of the first substrate and the second substrate thus formed may comprise (but not limited to) polymer substrate, metal substrate, or glass substrate. Therefore, it facilitates providing a relatively superior property of usability with a relatively low cost.

According to an embodiment of the disclosure, since there are no restrictive requirements on specific types of liquid crystals in the liquid crystal layer, and those skilled in the art may make choice on specific types of liquid crystals as per practical requirements. In an embodiment of the disclosure, in a thermotropic liquid crystal typically used in the field of display, the specific type of liquid crystal may comprise (but not limited to) nematic liquid crystals, smectic liquid crystals, or cholesteric liquid crystals. Therefore, a relatively superior display effect may be obtained.

Figure 3:
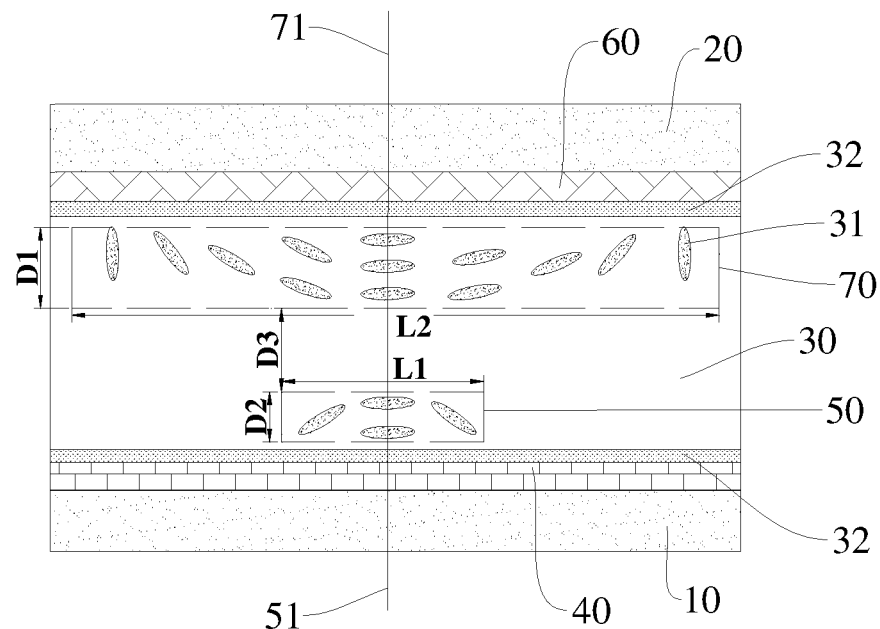
FIG. 3 illustrates a structural schematic view of another display panel according to an embodiment of the disclosure.

Of course, it may be understood by those skilled that, referring to FIG. 3, alignment layers are provided respectively on two surfaces of the liquid crystal layer 30 abutting against the first substrate 10 and the second substrate 20, and thus a functionality of alignment of liquid crystal molecules may in turn be implemented.

According to an embodiment of the disclosure, in order to further enhance the light transmittance, as illustrated in FIG. 2, a principal optical axis 51 of the first equivalent liquid crystal lens 50 and a principal optical axis 71 of the second equivalent liquid crystal lens 70 are arranged on one and the same straight line. Therefore, light rays gathered or converged in the first equivalent liquid crystal lens may diffuse completely to spread in a relatively uniform manner into the second equivalent liquid crystal lens, not only enhancing light utilization efficiency but also improving uniformity in spreading of the light, thus improving in turn the display quality of images by the display panel. According to some embodiments of the disclosure, referring to FIG. 9, a focal point of the first equivalent liquid crystal lens 50 and a focal point of the second equivalent liquid crystal lens 70 coincide with each other, so as to ensure that all light rays gathered or converged in the first equivalent liquid crystal lens 50 may irradiate completely into the second equivalent liquid crystal lens 70, and then is emitted out of the display panel from a surface of the first substrate 20 adjacent to the second equivalent liquid crystal lens 70 and away from the liquid crystal layer 30, in a direction parallel to the principal optical axes of the lenses, so as not only to enhance the light utilization efficiency but also to prevent an occurrence of a color mixture phenomenon. According to some other embodiments of the disclosure, as illustrated in FIG. 2, the principal optical axis 51 of the first equivalent liquid crystal lens 50 and the principal optical axis 71 of the second equivalent liquid crystal lens 70 are perpendicular to the first substrate 10 and the second substrate 20, respectively. Therefore, light rays gathered or converged in the first equivalent liquid crystal lens 50 and the second equivalent liquid crystal lens 70 may be diffused outwards completely in a uniform manner, enhancing the light utilization efficiency.

According to an embodiment of the disclosure, in order to further increase the light utilization efficiency of the display panel, as illustrated in FIGS. 2-13, each of the first equivalent liquid crystal lens and the second equivalent liquid crystal lens is arranged symmetrically along respective principal optical axis, individually. Therefore, each of the first equivalent liquid crystal lens and the second equivalent liquid crystal lens is of a symmetric structure, and in a condition that the principal optical axis of the first equivalent liquid crystal lens and the principal optical axis of the second equivalent liquid crystal lens are located in a same straight line, then, light rays originating from a backlight source may be distributed uniformly in the first equivalent liquid crystal lens and then be irradiated completely and uniformly into the second equivalent liquid crystal lens, and finally incident on a color filter layer uniformly, which may not only enhance the light utilization efficiency but also improve the display quality of the display panel.

According to an embodiment of the disclosure, in order to ensure a relatively satisfactory resolution of the display panel simultaneously when the light transmittance is improved, then an equivalent width L2 of the second equivalent liquid crystal lens is for example set to be 3 to 6 times of the equivalent width L1 of the first equivalent liquid crystal lens. Thereby, the light rays gathered or converged in the first equivalent liquid crystal lens then is diffused into the second equivalent liquid crystal lens of a larger size, so as to enlarge a scattered area of the light rays and to increase the light utilization efficiency thereof, and simultaneously to ensure a relatively fine resolution of the display panel. According to some embodiments of the disclosure, since there are no restrictive requirements on specific sizes of the first equivalent liquid crystal lens and the second equivalent liquid crystal lens, then those skilled in the art may design the specific sizes flexibly depending on setting requirements of parameters of various structures of the display panel and the resolution of the display panel. In an embodiment of the disclosure, the equivalent width L1 of the first equivalent liquid crystal lens is 9-17 micrometers, such as 10 micrometers, 15 micrometers and the like, and then the equivalent width L2 of the second equivalent liquid crystal lens may be designed according to the relationship that the equivalent width L2 of the second equivalent liquid crystal lens is 3 to 6 times of the equivalent width L1 of the first equivalent liquid crystal lens and specific parameters of the display panel; for example, the equivalent width of the second equivalent liquid crystal lens may be set to be 30 micrometers, 45 micrometers, 50 micrometers and the like. Therefore, the display panel has a relatively high light utilization efficiency, a relatively fine resolution and thus a strong competitive ability.

According to an embodiment of the disclosure, since there are no restrictive requirements on an equivalent thickness D1 of the first equivalent liquid crystal lens and an equivalent thickness D2 of the second equivalent liquid crystal lens, and those skilled in the art may design such thicknesses flexibly depending on practical requirements such as specific parameters and setting requirements of the display panel and the like.

According to an embodiment of the disclosure, since there are no specific restrictive requirements on a focal length of the first equivalent liquid crystal lens and a focal length of the second equivalent liquid crystal lens, those skilled in the art may design the focal lengths flexibly depending on various specific parameters and different grayscales of different display panels, as long as an adjustment of the grayscale during displaying of the display panel may be implemented by the first equivalent liquid crystal lens and the second equivalent liquid crystal lens.

Figure 4:
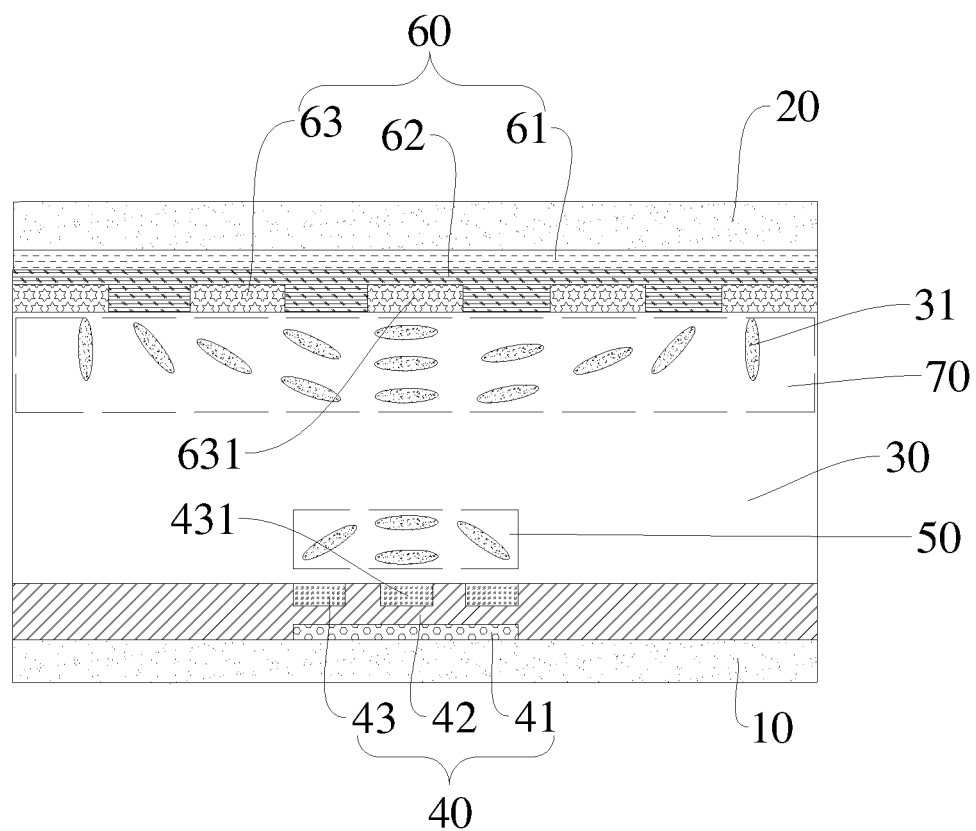
FIG. 4 illustrates a structural schematic view of still another display panel according to an embodiment of the disclosure.

According to an embodiment of the disclosure, as mentioned above, the first equivalent liquid crystal lens and the second equivalent liquid crystal lens are implemented respectively by adjusting voltages applied onto the first electrode assembly and the second electrode assembly respectively and individually, without much too strict restrictive requirements on setting modes and structures of the first electrode assembly and the second electrode assembly. Therefore, those skilled in the art may make a design flexibly accordingly as per practical requirements. In some embodiment of the disclosure, in order to adjust various parameters of the first equivalent liquid crystal lens and the second equivalent liquid crystal lens as above simply and readily, then, specific structures of the first electrode assembly and the second electrode assembly are introduced hereinafter in detail, as illustrated in FIG. 4, specifically as follows.

The first electrode assembly 40 comprises: a first sub-electrode 41 disposed on the surface of the first substrate 10 facing towards the liquid crystal layer 30; a first insulation layer 42 which is also disposed on the surface of the first substrate 10 facing towards the liquid crystal layer 30 and covers the first sub-electrode 41; and a plurality of second sub-electrodes 43 disposed on a surface of the first insulation layer 42 abutting against the liquid crystal layer, an orthographic projection of the first sub-electrode 41 on the first substrate 10 covering orthographic projections of the plurality of second sub-electrodes 43 on the first substrate 10. By way of example, the plurality of second sub-electrodes 43 may be spaced apart from one another in a same layer, and their orthographic projections on the first substrate 10 may be covered by the orthographic projection of the first sub-electrode 41 on the first substrate 10. Therefore, by applying different voltages on the first sub-electrode and the plurality of second sub-electrodes, then there may be voltage difference(s) existing between the plurality of second sub-electrodes and the first sub-electrode, and in turn the liquid crystal molecules located adjacent to the first electrode assembly may be deflected, and thus form the first equivalent liquid crystal lens projecting in a direction facing towards the liquid crystal layer 30 and away from the first substrate.

The second electrode assembly 60 comprises: a third sub-electrode 61 disposed on the surface of the second substrate 20 facing towards the liquid crystal layer 30; a second insulation layer 62 which is also disposed on the surface of the second substrate 20 facing towards the liquid crystal layer 30 and covers the third sub-electrode 61; and a plurality of fourth sub-electrodes 63 on a surface of the second insulation layer 62 abutting against the liquid crystal layer 30, an orthographic projection of the third sub-electrode 61 on the second substrate 20 covering orthographic projections of the plurality of fourth sub-electrodes 63 on the second substrate 20. By way of example, the plurality of fourth sub-electrodes 63 are spaced apart from one another in a same layer and their orthographic projections on the second substrate 20 may be covered by the orthographic projection of the third sub-electrode 61 on the second substrate 20. Therefore, by applying different voltages on the third sub-electrode and the plurality of fourth sub-electrodes, then there may be voltage difference(s) existing between the plurality of fourth sub-electrodes and the third sub-electrode, and in turn the liquid crystal molecules located adjacent to the second electrode assembly may be deflected, and thus form the second equivalent liquid crystal lens projecting in a direction facing towards the liquid crystal layer 30 and away from the second substrate.

According to an embodiment of the disclosure, there may be no specific restrictive requirements on distribution conditions of the plurality of second sub-electrodes and the plurality of fourth sub-electrodes, and those skilled in the art may make a design flexibly as per practical requirements. In some embodiments of the disclosure, since it is required that the principal optical axis of the first equivalent liquid crystal lens and the principal optical axis of the second axis are located in a same straight line, and perpendicular to the first substrate and the second substrate, respectively, then the plurality of second sub-electrodes and the plurality of fourth sub-electrodes need to be distributed uniformly.

According to an embodiment of the disclosure, in order to diffuse the light rays uniformly and to enhance the light utilization efficiency, as illustrated in FIG. 4, each of the first equivalent liquid crystal lens and the second equivalent liquid crystal lens is disposed symmetrically about respective principal optical axis, respectively. And in order to obtain the first equivalent liquid crystal lens disposed symmetrically about its principal optical axis and the second equivalent liquid crystal lens disposed symmetrically about its principal optical axis, then, in the embodiment of the disclosure, by way of example, voltages of the plurality of second sub-electrodes and the plurality of fourth sub-electrodes increase sequentially and gradually from the middle to both sides thereof, respectively; and in a further embodiment, by way of example, voltages of the plurality of second sub-electrodes and the plurality of fourth sub-electrodes increase in a symmetrical manner sequentially and gradually from the middle to both sides thereof. Therefore, a voltage difference between the plurality of second sub-electrodes and the first sub-electrode and a voltage difference between the plurality of fourth sub-electrodes and the third sub-electrode may for example increase in a symmetric manner sequentially and gradually from the middle to both sides thereof; thereby, deflection levels of the liquid crystal molecules in each of the first equivalent liquid crystal lens and the second equivalent liquid crystal lens may increase in a symmetric manner sequentially and gradually from respective principal optical axis to both sides thereof, respectively, and the first equivalent liquid crystal lens and the second equivalent liquid crystal lens, each of which may be constructed relatively uniform and symmetrically, may in turn be formed, such that the light rays gathered or converged in the first equivalent liquid crystal lens diffuse and spread into the second equivalent liquid crystal lens uniformly and are then emitted outwards from the second equivalent liquid crystal lens uniformly.

According to an embodiment of the disclosure, there are not restrictive requirements on specific numbers of the plurality of second sub-electrodes and the plurality of fourth sub-electrodes, then those skilled in the art may make a choice on such specific numbers thereof flexibly depending on practical requirements. However, since the equivalent width of the first equivalent liquid crystal lens is smaller than the equivalent width of the second equivalent liquid crystal lens, then it may be chosen that the plurality of fourth sub-electrodes may for example be more in number than the plurality of the second sub-electrodes. However, in order to further enhance symmetry of each of the first equivalent liquid crystal lens and the second equivalent liquid crystal lens, and to increase the light utilization efficiency and to improve uniformity in spreading/diffusing of the light, then, as illustrated in FIGS. 2-4 (the numbers of the plurality of second sub-electrodes and the plurality of fourth sub-electrodes as illustrated in FIG. 4 are merely illustrative schematically, rather than limiting the specific numbers thereof respectively), there are an odd number of the plurality of second sub-electrodes and also an odd number of the plurality of fourth sub-electrodes, respectively. Therefore, there is a second central electrode 431 existing in the plurality of second sub-electrodes, and a fourth central electrode 631 existing in the plurality of fourth sub-electrodes; i.e., the second central electrode 431 functions as a middlemost second sub-electrode in the plurality of second sub-electrodes, and the fourth central electrode 631 functions as a middlemost fourth sub-electrode in the plurality of fourth sub-electrodes. Since the principal optical axis of the first equivalent liquid crystal lens and the principal optical axis of the second axis are located in one and the same straight line, then a central axis of the second central electrode and a central axis of the fourth central electrode are located in a single straight line which coincides with the principal optical axes of the first equivalent liquid crystal lens and the second equivalent liquid crystal lens. In an embodiment of the disclosure, by controlling the voltages of the first electrode assembly and the second electrode assembly, the liquid crystal molecules aligned with the second central electrode and the fourth central electrode in the direction of the principal optical axes may not be deflected; in other words, a voltage difference between the second central electrode and the first sub-electrode is controlled to be zero, and a voltage difference between the fourth central electrode and the third sub-electrode is controlled to be zero. And the voltage difference between the second sub-electrodes and the first sub-electrode increases in a symmetric manner sequentially and gradually from the second central electrode towards both sides; and the voltage difference between the fourth sub-electrodes and the third sub-electrode increases in a symmetric manner sequentially and gradually from the fourth central electrode towards both sides, such that in both the first equivalent liquid crystal lens and the second equivalent liquid crystal lens, the deflection of the liquid crystal molecules from respective principal optical axes towards both sides thereof may increase in a symmetric manner sequentially and gradually, so as to form the first equivalent liquid crystal lens and the second equivalent liquid crystal lens each of which is constructed to be completely symmetric.

According to an embodiment of the disclosure, in order to implement a zero voltage difference between the second central electrode and the first sub-electrode, and to implement a zero voltage difference between the fourth central electrode and the third sub-electrode, then it is required that the voltage of the first sub-electrode is equal to the voltage of the second central electrode and the voltage of the third sub-electrode is equal to the voltage of the fourth central electrode. There are no specific restrictive requirements on specific values of the voltage of the first sub-electrode, the voltage of the second central electrode in the plurality of the second sub-electrodes, the voltage of the third sub-electrode, and the voltage of the fourth central electrode in the plurality of the fourth sub-electrodes, as long as the voltage of the first sub-electrode is equal to the voltage of the second central electrode, and the voltage of the third sub-electrode is equal to the voltage of the fourth central electrode. In an embodiment of the disclosure, the voltage of the first sub-electrode, the voltage of the second central electrode in the plurality of the second sub-electrodes, the voltage of the third sub-electrode, and the voltage of the fourth central electrode in the plurality of the fourth sub-electrodes are all set to be zero, facilitating an easy operation and a simple preparation, with a relatively low cost.

According to an embodiment of the disclosure, since the voltages applied on the plurality of second sub-electrodes increase in a symmetric manner sequentially and gradually from the second central electrode to both sides, without any restrictive requirements on specific value of voltage of each of the plurality of second sub-electrodes, those skilled in the art may make a design thereof flexibly depending on specific conditions such as requirements of deflection of the liquid crystal molecules, and a value of the voltage of the first sub-electrode and the like. In some embodiments of the disclosure, the voltages of the second central electrode and the first sub-electrode are zero, and the voltages of the plurality of second sub-electrodes increase sequentially and gradually from the second central electrode towards both sides, with a maximal value of 4V. And various second sub-electrodes located therebetween have their respective voltages increasing sequentially and gradually in a form of an arithmetic progression, or in a form of a non-arithmetic progression towards both ends or sides, specific conditions of which may be set up flexibly depending on practical requirements such as specific parameters of the display panel and requirements on deflection of the liquid crystal molecules and the like, without being limited herein.

According to an embodiment of the disclosure, since the voltages applied on the plurality of fourth sub-electrodes increase in a symmetric manner sequentially and gradually from the fourth central electrode to both sides, without any restrictive requirements on specific value of voltage of each of the plurality of fourth sub-electrodes, those skilled in the art may make a design thereof flexibly depending on specific conditions such as requirements of deflection of the liquid crystal molecules, and a value of the voltage of the third sub-electrode and the like. In some embodiments of the disclosure, the voltages of the fourth central electrode and the third sub-electrode are zero, and the voltages of the plurality of fourth sub-electrodes increase sequentially and gradually from the fourth central electrode towards both sides, with a maximal value of 10V. And various fourth sub-electrodes located therebetween have their respective voltages increasing sequentially and gradually in a form of an arithmetic progression, or in a form of a non-arithmetic progression towards both ends or sides, specific conditions of which may be set up flexibly depending on practical requirements such as specific parameters of the display panel and requirements on deflection of the liquid crystal molecules and the like, without being limited herein.

According to an embodiment of the disclosure, since there are no special restrictive requirements on specific materials for forming the first sub-electrode, the plurality of second sub-electrodes, the third sub-electrode and the plurality of fourth sub-electrodes, those skilled in the art may make choices of the materials flexibly depending on practical conditions. In an embodiment of the disclosure, the specific material(s) for forming the first sub-electrode, the plurality of second sub-electrodes, the third sub-electrode and the plurality of fourth sub-electrodes may for example comprise (but not limited to) metal materials such as Indium Tin Oxide (ITO), silver, copper, aluminum and the like.

According to an embodiment of the disclosure, since there are no special restrictive requirements on specific materials for forming the first insulation layer and the second insulation layer, those skilled in the art may make choices of the materials flexibly depending on practical conditions. In an embodiment of the disclosure, the specific material(s) for forming the first insulation layer and the second insulation layer may for example comprise (but not limited to): polyimide, acrylic, epoxy resin, polyethylene glycol terephthalate, polyethylene naphthalate, polycarbonate, polyimide, polyvinylsulfonate, polyformaldehyde, polyarylate, and hexamethyldisiloxane.

Figure 5:
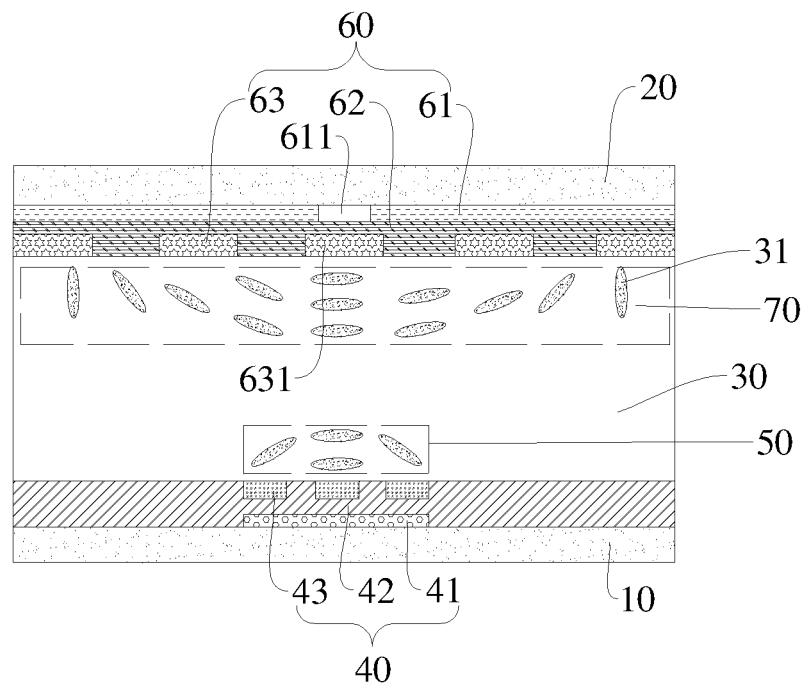
FIG. 5 illustrates a structural schematic view of yet another display panel according to an embodiment of the disclosure.
Figure 10:
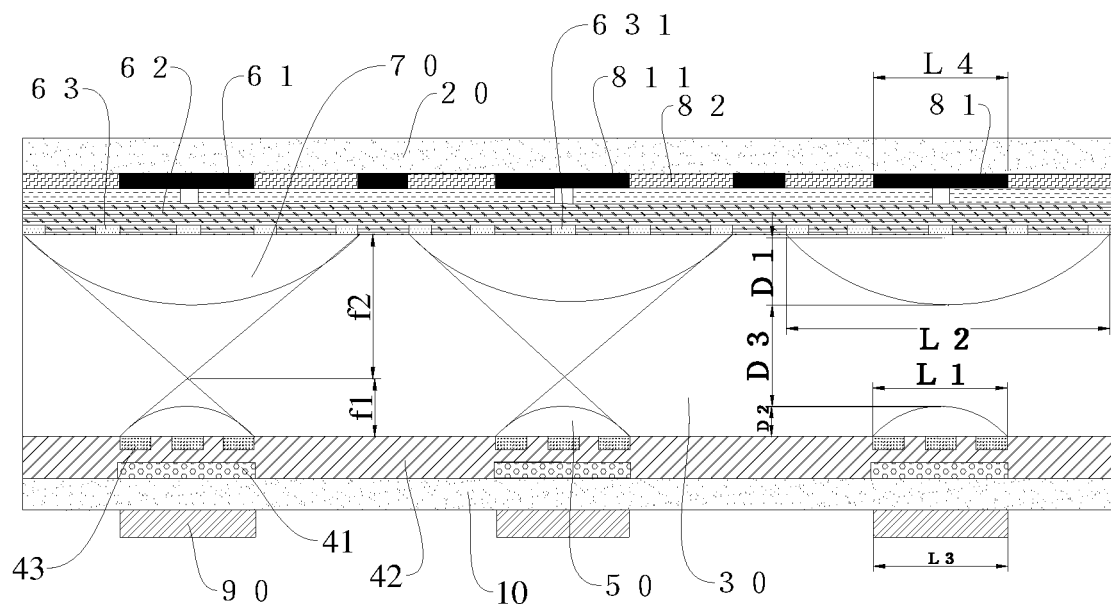
FIG. 10 illustrates a structural schematic view of further another display panel according to an embodiment of the disclosure.

According to an embodiment of the disclosure, as illustrated in FIG. 5, in order to further improve the light utilization efficiency, the third sub-electrode 61 is provided with at least one first opening 611, and an orthographic projection of a fourth central electrode 631 on the second substrate covers an orthographic projection of the first opening 611 on the second substrate. Therefore, in a condition that voltages are applied respectively to the third sub-electrode and the plurality of fourth sub-electrodes in the second electrode assembly, an edge electric field or fringing electric field is formed between other fourth sub-electrodes of the plurality of fourth sub-electrodes located nearest to the fourth central electrode 631 at both sides thereof and edges of the third sub-electrode 61 defining the first opening, therefore the deflection of the liquid crystal molecules located adjacent to the liquid crystal molecules aligned with the fourth central electrode (e.g., aligned vertically) may be strengthened, so as to ensure a perfect match of topography between the first equivalent liquid crystal lens and the second equivalent liquid crystal lens, such that the first equivalent liquid crystal lens has its curved surface being a spherical surface and the second equivalent liquid crystal lens has its curved surface also being a spherical surface, facilitating maximizing the light utilization efficiency. If the first opening is not provided, then a deflection level of the liquid crystal molecules located adjacent to the liquid crystal molecules aligned with the fourth central electrode in the direction of the principal optical axis thereof may be relatively smaller as compared with the deflection level in existence of the first opening, resulting in an adverse influence on matching degree of topography between the first equivalent liquid crystal lens and the second equivalent liquid crystal lens. Moreover, by providing the opening, an arch height of the second equivalent liquid crystal lens may be higher than the arch height of the second equivalent liquid crystal lens in absence of the opening (or in other words, an equivalent thickness D1 of the second equivalent liquid crystal lens may be relatively thick, as illustrated in FIG. 10), so as to enhance the utilization efficiency of the liquid crystals and to improve the light utilization efficiency.

According to an embodiment of the disclosure, since there are no restrictive requirements on size of the first opening, those skilled in the art may make a choice thereof flexibly as per practical requirements. In some embodiments of the disclosure, a width of the first opening may for example be set to be 1/10 to 4/5 of a width of the fourth central electrode. Therefore, by setting the size of the first opening within such a range, the light utilization efficiency may be relatively high, enhancing a luminous efficiency maximally. In an exemplary embodiment of the disclosure, the width of the first opening may for example be further chosen to be 2/3 of the width of the fourth central electrode. Therefore, the light utilization efficiency may be maximized, enhancing a luminous efficiency maximally.

According to an embodiment of the disclosure, by way of example, the display panel further comprises a color film layer which is disposed between the second substrate and the second electrode assembly; and the display panel also comprises: a plurality of color filters and black matrices, both types are spaced apart from and alternating with one another. For example, each of the plurality of color filters comprises a plurality color filter units of different colors (e.g., three color filter units in three primary colors of Red, Green, Blue, thus being referred to as R, G, B units, respectively), and all these color filter units are spaced apart from one another by a black matrix (e.g., by various sub-black matrices as components of the black matrix). The black matrix functions as a separator for preventing any light leakage among these color filter units of various primary colors, in each of the color filters, and any mutual interference among different color lights thus formed. Therefore, the light rays are diffused uniformly to irradiate onto the color filters, implementing a colored display and improving image quality of the display panel. Furthermore, by way of example, in a condition that voltages applied onto the first electrode assembly and the second electrode assembly are zero, or are adjusted such that an orthogonal projection of the black matrix overs an orthogonal projection of the second equivalent liquid crystal lens which is at least partially aligned with the black matrix on the second substrate, then, incident light rays are completely illuminated onto the black matrix and absorbed there, so as to implement a dark state display.

Figure 6:
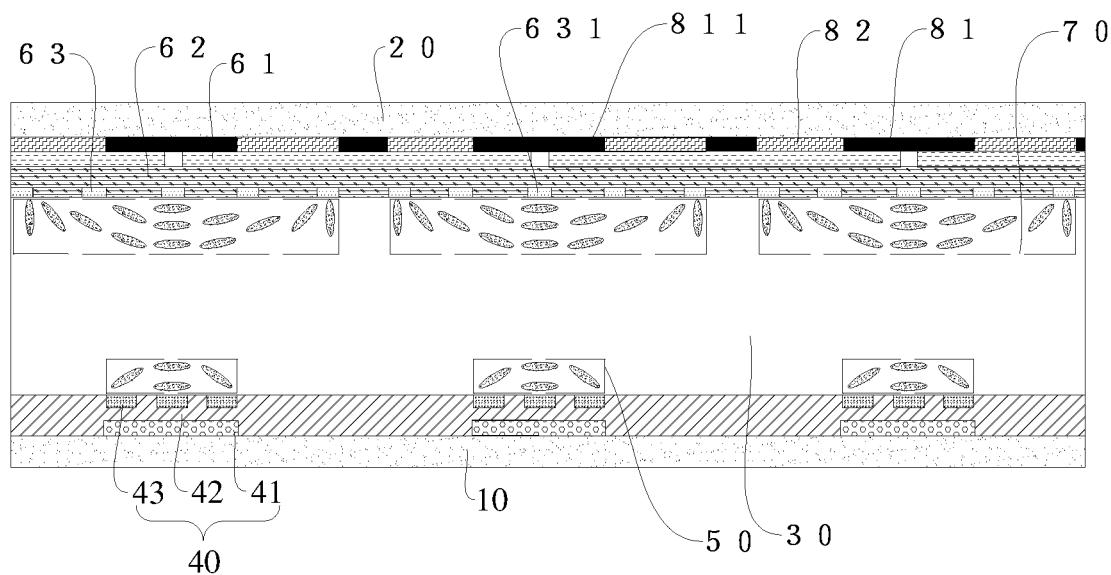
FIG. 6 illustrates a structural schematic view of still yet another display panel according to an embodiment of the disclosure.

Alternatively or additionally, since various color filter units (e.g., R, G, B units as above) of different colors in each of the color filters have respective width of their own, then, as compared with above embodiment, in order to further facilitate preventing any light leakage among these color filter units of various primary colors, in each of the color filters, and any mutual interference among different color lights thus formed, and to ensure a better dark state display, then, by way of example, according to an embodiment of the disclosure, as illustrated in FIG. 6, the display panel further comprises a color film layer provided between the second substrate 20 and the second electrode assembly 60, the color film layer comprising: a black matrix 81 defining a plurality of second openings spaced apart from one another; and a plurality of color filters 82 spaced apart from one another and alternating between adjacent ones of the plurality of second openings, respectively. each of the plurality of color filters comprises a plurality color filter units of different colors (e.g., three color filter units in three primary colors of Red, Green, Blue, thus being referred to as R, G, B units, respectively), and all these color filter units are spaced apart from one another by a black matrix. And furthermore, at least one sub-black matrix is interposed within each of the plurality of color filters, e.g., through an entire thickness of each of the plurality of color filters, dividing each of the plurality of color filters into an even number of sub-color filters having an identical color. And other setting are further implemented, such that an equivalent orthographic projection of the second equivalent liquid crystal lens 70 on the second substrate 20 covers an even number of color filters having an identical color in each of the plurality of color filters, and one of the at least one sub-black matrix functions as a central black matrix 811 which is most centrally located therein, in the middle of the even number of sub-color filters. For example, in a condition that a single sub-black matrix is interposed within each of the plurality of color filters, e.g., through an entire thickness of each of the plurality of color filters, then, the single sub-black matrix is the central black matrix 811; and in a condition that only three sub-black matrices are inserted within each color filter unit therethrough in a thickness direction thereof, then another sub-black matrix between sub-black matrices located at both sides functions as the central black matrix 811. In a further embodiment, for example, in at least one sub-black matrix interposed within each color filter unit, a width of the central black matrix 811 may for example be larger than that of other sub-black matrices disposed alongside. Thereby, by way of example, in a condition that voltages applied onto the first electrode assembly and the second electrode assembly are zero, or are adjusted such that an orthographic projection of a central black matrix 811 (which is located centrally in each of the plurality of color filter units) on the second substrate 20 covers the orthographic projection of the fourth central electrode 631 on the second substrate 20, such that incident light rays are essentially illuminated completely onto the central black matrix of each color filter unit and absorbed there, so as to implement the dark state display. Therefore, the light rays are diffused uniformly to irradiate onto the color filters, implementing a colored display and improving image quality of the display panel.

According to an embodiment of the disclosure, since the equivalent orthographic projection of the second equivalent liquid crystal lens 70 on the second substrate 20 covers an even number of color filters 82 having an identical color, respectively, and there are no restrictive requirements on specific numbers of the color filters having an identical color which are aligned in the direction of the principal optical axis with one and the same second equivalent liquid crystal lens, as long as there are an even number of the color filters having an identical color, then, those skilled in the art may set the specific number of the color filters having the identical color depending on practical requirements. As such, in FIGS. 6-13, only two color filters are exemplarily illustrated to be aligned with the second equivalent liquid crystal lens, rather than limiting the specific number of the color filters having the identical color and aligned with one and the same second equivalent liquid crystal lens. In addition, it may be understood for those skilled in the art that, since there may be an even number of color filters which have an identical color and are aligned with one and the same second equivalent liquid crystal lens, then there may accordingly be an odd number of sub-black matrices among the even number of color filters, and a middlemost one in the odd number of sub-black matrices is the central black matrix 811.

According to an embodiment of the disclosure, since there are no restrictive requirements on specific material for forming the black matrix, then those skilled in the art may choose flexibly any one applicable light-shielding material to form the black matrix depending on practical requirements, e.g., a metallic oxide photoresist film or a resin type black photoresist film, without being limited in this connection in the embodiment of the disclosure.

According to an embodiment of the disclosure, since there are no restrictive requirements on material for forming the color filters, then those skilled in the art may choose its material flexibly depending on practical requirements, e.g., to choose a material functioning as a color photoresist material of a color filter film layer. As mentioned above, a relevant color filter layer has a light transmittance of merely 28%, therefore, in some embodiments of the disclosure, in order to further enhance the light transmittance of the display panel, the material for forming the color filters comprises quantum dots. Therefore, the light transmittance of the display panel may be enhanced. Specifically, on the basis that the first equivalent liquid crystal lens and the second equivalent liquid crystal lens are used instead of the polarizer(s), quantum dots may further be employed as color filters, such that the light transmittance of the display panel may be up to 30%; in other words, as compared with the light transmittance of 5-5.5% in the relevant art in existence of the polarizer(s), the light transmittance of the display panel in embodiment of the disclosure is increased, at a ratio of increase being represented as a ratio of an incremental quantity of light transmittance and an original value of the light transmittance of at least 445.4%.

According to an embodiment of the disclosure, since there are no restrictive requirements on the specific type of the quantum dots, and those skilled in the art may choose an applicable quantum dot material flexibly depending on practical requirements. In an embodiment of the disclosure, the specific type of the material forming the quantum dots may comprise (but not limited to): silicon quantum dots, germanium quantum dots, cadmium sulfide quantum dots, cadmium selenide quantum dots, cadmium telluride quantum dots, zinc selenide quantum dots, lead sulfide quantum dots, lead selenide quantum dots, indium phosphide quantum dots, indium arsenide quantum dots. As such, a wide selectivity may be obtained, with a high operational performance, i.e., usability.

According to an embodiment of the disclosure, light rays originating from the backlight source may be gathered or converged in a plurality of first equivalent liquid crystal lenses and then be diffused into a plurality of second equivalent liquid crystal lenses. Therefore, in order to prevent any light ray from passing through regions outside the first equivalent liquid crystal lenses and to avoid any influence thus caused onto display effect, then it is required that a certain control method is adopted to control the light rays originating from the backlight source to irradiate merely from regions aligned with the first electrode assembly or the first equivalent liquid crystal lens into the display panel. According to an embodiment of the disclosure, there are no restrictive requirements on the control method, and those skilled in the art may make a flexible choice in this connection depending on practical requirements. For example, the backlight source may be designed, such that it may merely emit light rays towards locations of the regions aligned with the first equivalent liquid crystal lens or the first electrode assembly; or a reflector may be provided on the surface of the first substrate away from the liquid crystal layer and in regions not aligned with the first electrode assembly or the first equivalent liquid crystal lens, such that the light rays originating from the backlight source and propagating towards the reflector may be reflected toward the regions aligned with the first electrode assembly or the first equivalent liquid crystal lens.

Figure 7:
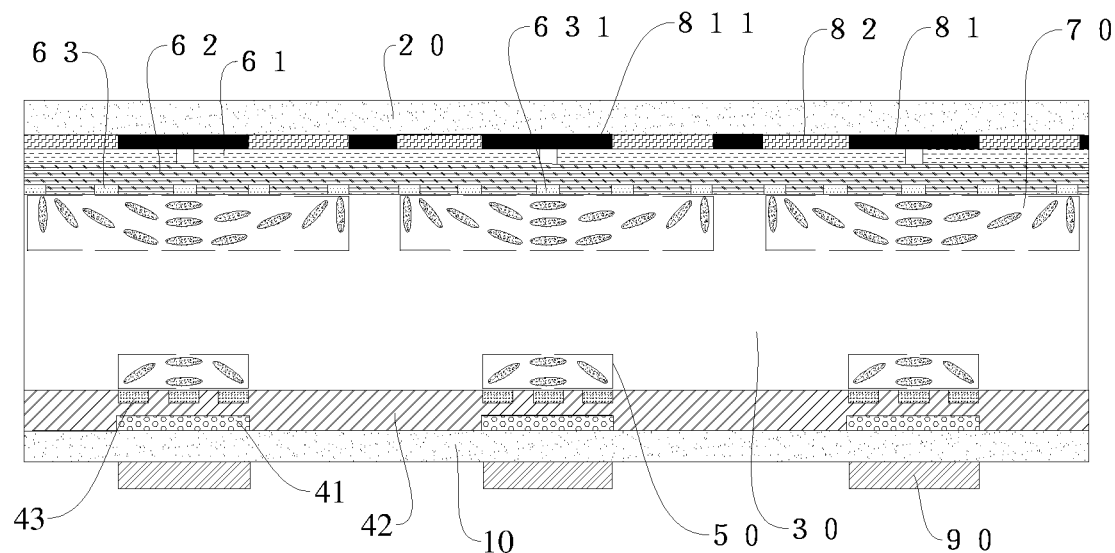
FIG. 7 illustrates a structural schematic view of further another display panel according to an embodiment of the disclosure.
Figure 8:
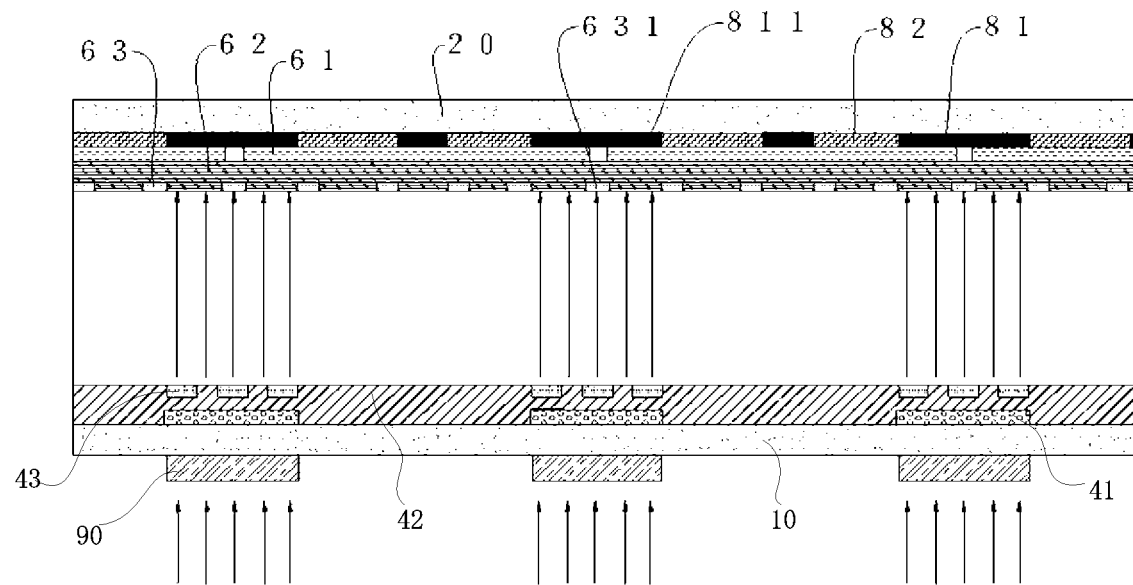
FIG. 8 illustrates a structural schematic view of further another display panel according to an embodiment of the disclosure.

According to an embodiment of the disclosure, in order that the light rays of the backlight source emit may be collimated to emit into the display panel, as illustrated in FIG. 7, collimators 90, each of which is formed to be in a bar shape, may be provided on a surface of the first substrate facing away from the liquid crystal layer and in a region in alignment with the first electrode assembly or the first equivalent liquid crystal lens in a direction of the principal optical axis of the first equivalent liquid crystal lens. Specifically, the collimators 90 may for example be provided on the surface of the first substrate 10 facing away from the liquid crystal layer 30; or alternatively, the collimators 90 may for example be provided in a region on a surface of the first substrate 10 facing towards the liquid crystal layer 30, the region being in alignment with the first electrode assembly or the first equivalent liquid crystal lens in a direction of a principal optical axis of the first equivalent liquid crystal lens. And an orthographic projection of the central black matrix 811 on the first substrate 10 covers orthographic projections of the collimators 90 on the first substrate 10, in a region in alignment with the first electrode assembly or the first equivalent liquid crystal lens in a direction of the principal optical axis of the first equivalent liquid crystal lens. Thereby, the light rays originating from the backlight source are collimated and emitted into the display panel, so as to enhance the light utilization efficiency. Moreover, since the orthographic projection of the central black matrix 811 on the first substrate 10 covers the orthographic projections of the collimator 90 on the first substrate 10, in the region in alignment with the first electrode assembly or the first equivalent liquid crystal lens in a direction of the principal optical axis of the first equivalent liquid crystal lens, then a dark state display of the display panel may be implemented. Specifically, as illustrated in FIG. 8, the light rays are incident on and into the display panel through the collimators, and since neither the first equivalent liquid crystal lens nor the second equivalent liquid crystal lens may be formed in absence of voltages being applied on the first electrode assembly and the second electrode assembly, then the light rays may be collimated to be incident on the central black matrix 811 and absorbed thereby after passing through the first substrate and the first electrode assembly, so as to implement the dark state display of the display panel.

According to an embodiment of the disclosure, since there are no restrictive requirements on the specific types of the collimators, those skilled in the art may make a choice in this connection depending on practical requirements. In some embodiments of the disclosure, each of the collimators may for example comprise (but not limited to) nano-scale diffraction patterns. According to some embodiments of the disclosure, there are no restrictive requirements on the width of each of the collimators, as long as the orthographic projection of the central black matrix 811 on the first substrate 10 covers the orthographic projection of the collimator 90 on the first substrate 10. In some embodiments of the disclosure, the width of each of the collimators is equal to the width of the first electrode assembly. Therefore, it facilitates enhancing the light utilization efficiency.

According to another aspect of the embodiments of the disclosure, there is provided a display device. According to an embodiment of the disclosure, the display device comprises the display panel as above, and a housing inside which the display panel is accommodated. Therefore, the display device has a relatively high light transmittance, a relatively fine image quality during display, and bright colors. Of course, it may be understood for those skilled in the art that, the display device possesses all technical features and advantages of the display panel as above, without repeating herein any more.

According to an embodiment of the disclosure, there are no special restrictions on specific types of the display device, and the display device may for example be any device or apparatus in the art having display functionality, for example but not limited to mobilephone, tablet computer, computer display, a game console, a television set, a display screen, a wearable device and other household or life electric appliances having display functionality.

Of course, it may be understood for those skilled in the art that, in addition to aforementioned display panel, the display device according to the embodiment of the disclosure may for example comprises necessary structures and components of a relevant display device. Taking the mobilephone as an example, in addition to the display panel according to the embodiment of the disclosure, it may for example selectively have additional structures and components of a relevant mobilephone, such as a touch screen, a casing, CPU, a camera module, a fingerprint identification module, a sound processing system and the like, without repeating in more detail herein.

According to still another aspect of the embodiments of the disclosure, there is provided a method for adjusting a grayscale of the display panel as above. According to an embodiment of the disclosure, the method comprises:

applying predetermined voltages on the first electrode assembly and the second electrode assembly respectively, so as to induce an increase in an equivalent curvature of at least one of the first equivalent liquid crystal lens and the second equivalent liquid crystal lens when the grayscales of the display panel ascend from a lower level to a higher level, and to induce a decrease in the equivalent curvature of at least one of the first equivalent liquid crystal lens and the second equivalent liquid crystal lens when the grayscales of the display panel descend from a higher level to a lower level. Therefore, the equivalent curvature of at least one of the first equivalent liquid crystal lens and the second equivalent liquid crystal lens may be adjusted by controlling the voltages of the first electrode assembly and the second electrode assembly respectively, so as to obtain an adjustment on the grayscale of the display panel, not only enhancing the light utilization efficiency but also improving the image quality; besides, this method is relatively simple, convenient and easy to be implemented.

According to an embodiment of the disclosure, when the predetermined voltages are applied on the first electrode assembly and the second electrode assembly, it is necessary to ensure that the voltage of the second central electrode in the plurality of second sub-electrodes is equal to the voltage of the first sub-electrode, the voltage of the fourth central electrode in the plurality of fourth sub-electrodes is equal to the voltage of the third sub-electrode, and voltages of the plurality of second sub-electrodes and voltages of the plurality of fourth sub-electrodes increase sequentially and gradually from the middle to both sides thereof, respectively. And then, when the grayscales of the display panel ascend from a lower level to a higher level, an increase margin in which the voltages of the plurality of second sub-electrodes and/or the plurality of fourth sub-electrodes increase sequentially and gradually from the middle to both sides respectively becomes larger gradually; and when the grayscales of the display panel descend from a higher level to a lower level, the increase margin in which the voltages of the plurality of second sub-electrodes and/or the plurality of fourth sub-electrodes increase sequentially and gradually from the middle to both sides respectively becomes smaller gradually. Therefore, the predetermined voltages of the first electrode assembly and the second electrode assembly are controlled on the basis of the above regularity, then a change of the equivalent curvature of at least one of the first equivalent liquid crystal lens and the second equivalent liquid crystal lens may be implemented, and a display at different grayscales of the display panel may in turn be implemented.

Next, the meaning of "when the grayscales of the display panel ascend from a lower level to a higher level, an increase margin in which the voltages of the plurality of second sub-electrodes and/or the plurality of fourth sub-electrodes increase sequentially and gradually from the middle to both sides respectively becomes larger gradually" may be illustrated exemplarily hereinafter. Specifically, taking a plurality of fourth sub-electrodes as an example, at a certain grayscale, for example, the voltages of the plurality of fourth sub-electrodes may be set in a direction starting from one side towards the middle and then towards the opposite side to be 8V, 4V, 0V, 4V, 8V respectively; in other words, the increase margin in which the voltages of the plurality of fourth sub-electrodes increase sequentially and gradually from the middle to both sides is 4V, and when the grayscales of the display panel become larger, then the voltages of the plurality of fourth sub-electrodes may be set respectively in the direction starting from one side towards the middle and then towards the opposite side to be 10V, 5V, 0V, 5V, 10V respectively; in other words, the increase margin in which the voltages of the plurality of fourth sub-electrodes increase sequentially and gradually from the middle to both sides becomes 5V. That is to say, when the grayscales of the display panel ascend from a lower level to a higher level, the increase margin in which the voltages of the plurality of fourth sub-electrodes increase sequentially and gradually from the middle to both sides becomes larger gradually. It may be understood by those skilled in the art that, a meaning of "an increase margin in which the voltages of the plurality of second sub-electrodes increase sequentially and gradually from the middle to both sides becomes larger gradually" is defined similarly as above, without repeating herein any more.

According to an embodiment of the disclosure, in order to facilitate controlling the change in the equivalent curvature of at least one of the first equivalent liquid crystal lens and the second equivalent liquid crystal lens individually, it may be controlled that the voltage of the second central electrode is equal to the voltage of the fourth central electrode. Thereby, it may prevent any voltage difference from being created between the second central electrode and the fourth central electrode, and thus prevent the liquid crystal molecules aligned with the second central electrode and the fourth central electrode in directions of respective principal optical axes from being deflected slightly, such voltage difference and slight deflection of the liquid crystal molecules not only failing to facilitate controlling the change in equivalent curvatures of the first equivalent liquid crystal lens and the second equivalent liquid crystal lens but also influencing the light utilization efficiency and the uniformity in spreading of the light.

According to an embodiment of the disclosure, as mentioned above, the adjustment of the grayscales of the display panel may be implemented by adjusting the voltage(s) of the first electrode assembly and/or the second electrode assembly, and in turn changing the equivalent curvature of at least one of the first equivalent liquid crystal lens and the second equivalent liquid crystal lens. In some embodiments of the disclosure as set forth hereinafter, by taking a bright state display (referred to as L255 state), a dark state display (referred to as L0 state), and a display state at a certain grayscale between the dark state display and the bright state display as an example, the method for adjusting the grayscale of the display panel as above is to be set forth in detail hereinafter.

Figure 9:
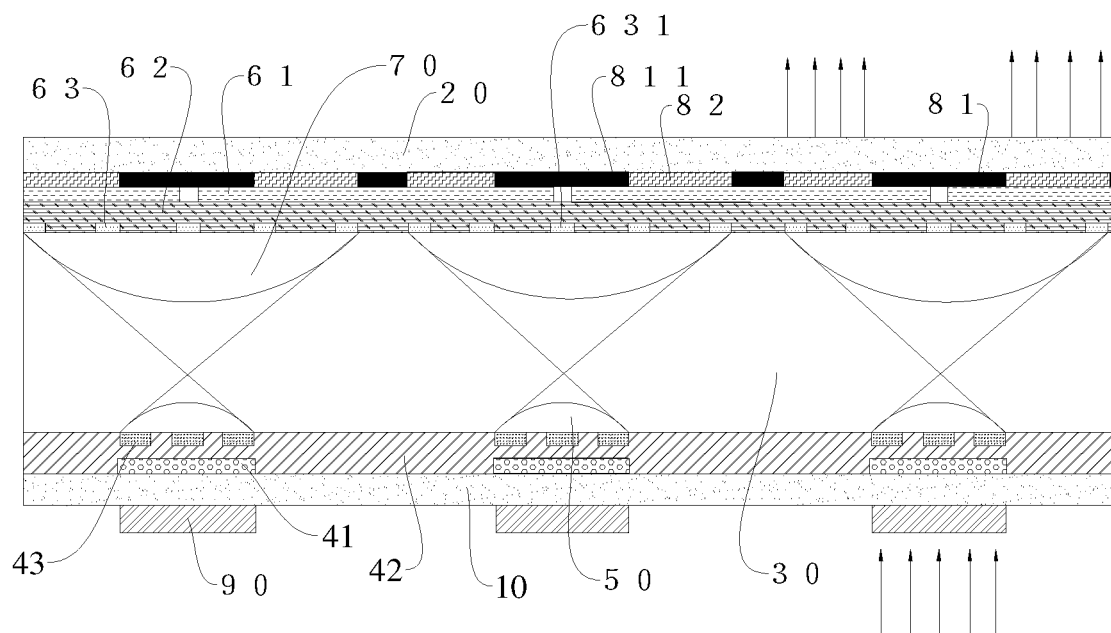
FIG. 9 illustrates a structural schematic view of further another display panel according to an embodiment of the disclosure.

In some embodiment of the disclosure, as illustrated in FIG. 9 (in which a diagram of optical paths of a pair of the first equivalent liquid crystal lens and the second equivalent liquid crystal lens is illustrated schematically) and FIG. 10, when the display state of the display panel is at the bright state (i.e., the L255 state), then both the equivalent widths, i.e., L1 and L2, of the first equivalent liquid crystal lens and the second equivalent liquid crystal lens reach their respective maximal values, i.e., the equivalent orthographic projection of the first equivalent liquid crystal lens 50 on the first substrate 10 overlaps with the orthographic projections of the plurality of second sub-electrodes 43 on the first substrate 10, which are aligned with the first equivalent liquid crystal lens in the direction of respective principal optical axis, and the equivalent orthographic projection of the second equivalent liquid crystal lens 70 on the second substrate 20 overlaps with the orthographic projections of the plurality of fourth sub-electrodes 63 on the second substrate 20, which are aligned with the second equivalent liquid crystal lens in the direction of respective principal optical axis, and both the equivalent widths and the equivalent curvatures of the first equivalent liquid crystal lens and the second equivalent liquid crystal lens reach maximal values correspondingly. As such, the light rays originating from the backlight source firstly pass through the collimators and then pass through the first electrode assembly to be gathered or converged in the first equivalent liquid crystal lens, and subsequently diffuse into the second equivalent liquid crystal lens of a relatively larger size so as to enlarge an area of illumination thereby, and next, and pass through the second electrode assembly to be incident onto the color filter layer. The light rays incident on the black matrix 81 are absorbed thereon but the light rays incident on the color filter s 82 may then be transmitted outwards therefrom, such that the bright state display of the display panel may be implemented.

According to some specific embodiments, as illustrated in FIG. 10 (i.e., the L255 display state), by way of example, the display device is designed that a cell gap of the liquid crystals of the display panel is 30 micrometers, and the liquid crystal molecules have an original deflection angle of 90° and an inclination angle of 2° relative to the first substrate and the second substrate, a width L3 of each collimator is 7-10 micrometers, an equivalent width L1 of the first equivalent liquid crystal lens is 10 micrometers, an equivalent width L2 of the second equivalent liquid crystal lens is 30 micrometers, a width L4 of the central black matrix is 11-14 micrometers. And with above datum, a result of simulating calculation may be obtained as follows: a focal length f1 of the first equivalent liquid crystal lens is 7.4 micrometers, an equivalent thickness D2 thereof is 5.6 micrometers; a focal length f2 of the second equivalent liquid crystal lens is 22.3 micrometers, an equivalent thickness D1 thereof is 16.8 micrometers; and a matching thickness D3 of the liquid crystals between the first equivalent liquid crystal lens and the second equivalent liquid crystal lens is 7.6 micrometers.

Figure 11:
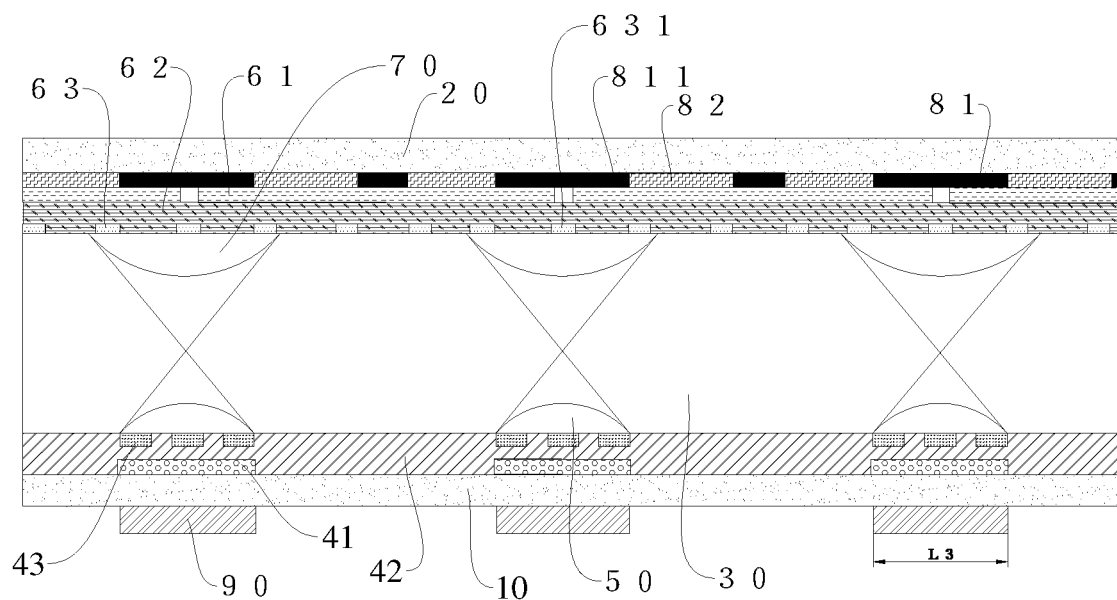
FIG. 11 illustrates a structural schematic view of further another display panel according to an embodiment of the disclosure.

According to some other embodiments, when the display state of the display is a display state at a certain grayscale between the dark state display and the bright state display, the equivalent curvature(s) of the first equivalent liquid crystal lens and/or the second equivalent liquid crystal lens may be adjusted by adjusting the voltage(s) of the first electrode assembly and/or the second electrode assembly, and in turn display of different grayscales of the display panel may be implemented, specifically as follows. The predetermined voltages may be applied to the first electrode assembly and the second electrode assembly, in order that: when the grayscales of the display panel ascend from a lower level to a higher level, then the equivalent curvature of at least one of the first equivalent liquid crystal lens and the second equivalent liquid crystal lens may be increased, with the focal point of the first equivalent liquid crystal lens being maintained in coincidence with the focal point of the second equivalent liquid crystal lens, such that it may be ensured that the light rays gathered or converged in the first equivalent liquid crystal lens may be irradiated completely into the second equivalent liquid crystal lens, not only enhancing the light utilization efficiency but also preventing an occurrence of a color mixture phenomenon; and when the grayscales of the display panel descend from a higher level to a lower level, then the equivalent curvature of at least one of the first equivalent liquid crystal lens and the second equivalent liquid crystal lens may be decreased, with the focal point of the first equivalent liquid crystal lens being maintained in coincidence with the focal point of the second equivalent liquid crystal lens, such that it may be ensured that the light rays gathered or converged in the first equivalent liquid crystal lens may be irradiated completely into the second equivalent liquid crystal lens, not only enhancing the light utilization efficiency but also preventing an occurrence of a color mixture phenomenon. In a typical embodiment of the disclosure, an adjustment of the grayscales of the display panel by adjusting the equivalent curvature of the first equivalent liquid crystal lens and/or the second equivalent liquid crystal lens mainly comprise two method as follows:

Method One: Adjusting the equivalent width(s) of the first equivalent liquid crystal lens and/or the second equivalent liquid crystal lens, and adjusting the equivalent curvature(s) of the first equivalent liquid crystal lens and/or the second equivalent liquid crystal lens, with the focal points of the first equivalent liquid crystal lens and the second equivalent liquid crystal lens being maintained unchanged, and above adjustments of both the equivalent width(s) and equivalent curvature(s) are implemented by adjusting voltage value(s) of the first electrode assembly and/or the second electrode assembly. Specifically, as illustrated in FIG. 11, when the grayscales of the display panel descend from a higher level to a lower level, by controlling voltages of the plurality of second sub-electrodes and/or the plurality of fourth sub-electrodes, an increase margin in which the voltages of the plurality of second sub-electrodes and/or the plurality of fourth sub-electrodes increase sequentially and gradually from the middle to both sides respectively becomes smaller gradually, and the equivalent curvature(s) of the first equivalent liquid crystal lens and/or the second equivalent liquid crystal lens may in turn be adjusted to become smaller, and the equivalent width(s) of the first equivalent liquid crystal lens and/or the second equivalent liquid crystal lens may also become smaller, with the focal points of both the first equivalent liquid crystal lens and the second equivalent liquid crystal lens being maintained unchanged. By taking the plurality of fourth sub-electrodes in the second electrode assembly as an example, in the direction from both sides towards the fourth central electrode, voltages may gradually fail to be applied on edge electrodes in the plurality of fourth sub-electrodes any more. For example, as illustrated in FIG. 11, if the specific number of the plurality of fourth sub-electrodes is five, when the grayscales descend, firstly, voltages are not applied onto two of the fourth sub-electrodes both of which are most marginal in the plurality of fourth sub-electrodes any longer, i.e., voltages are only applied onto three middle ones of the plurality of fourth sub-electrodes; and when the grayscales descend once again, then voltages applied onto the most marginal ones of the fourth sub-electrodes on which there are still voltages being applied may be cancelled symmetrically from both sides towards the middle sequentially. And a condition in which the voltages are applied on the plurality of the second sub-electrodes in the first electrode assembly is consistent with the condition in which the voltages are applied on the plurality of the fourth sub-electrodes in the second electrode assembly as above.

It should be noticed that, the first equivalent liquid crystal lens and the second equivalent liquid crystal lens are controlled individually by the first electrode assembly and the second electrode assembly, respectively. Therefore, when the grayscales descend, those skilled in the art may selectively adjust the first electrode assembly and/or the second electrode assembly in a flexible manner depending on practical conditions such as the grayscales practically displayed and the like, as illustrated in FIG. 11, when the grayscales are being adjusted, it is just intended to adjust the equivalent width of the second equivalent liquid crystal lens without adjusting the equivalent width of the first equivalent liquid crystal lens. And in the embodiment of the disclosure, there are no restrictive requirements on specific number of the second sub-electrodes and/or the fourth sub-electrodes whose respective voltages being applied thereon are cancelled by one time, then those skilled in the art may set flexibly in this connection depending on practical requirements such as the condition of grayscales to be adjusted and the like, certainly an optimal option should be that the voltages may be cancelled symmetrically from both sides toward the middle. For example, by taking the plurality of fourth sub-electrodes as an example, if the specific number of the plurality of fourth sub-electrodes is seven, when the grayscales descend, firstly, voltages are not applied onto two or four of the fourth sub-electrodes which are most marginal in the plurality of fourth sub-electrodes any longer, i.e., voltages are only applied onto five or three middle ones of the plurality of fourth sub-electrodes. Therefore, an adjustment on different grayscales may be implemented, enhancing the light transmittance at each grayscale condition, and in turn improving the display quality of the display panel.

Of course it may be understood that, on the contrary, when the grayscales ascend from a lower level to a higher level, specifically, by adjusting voltage(s) of the first electrode assembly and/or the second electrode assembly, an increase margin in which the voltages of the plurality of second sub-electrodes and/or the plurality of fourth sub-electrodes increase sequentially and gradually from the middle to both sides respectively becomes larger gradually, and the equivalent width(s) of the first equivalent liquid crystal lens and/or the second equivalent liquid crystal lens may in turn be adjusted to become larger, and the equivalent curvature(s) of the first equivalent liquid crystal lens and/or the second equivalent liquid crystal lens may also be adjusted to become larger, with the focal points of both the first equivalent liquid crystal lens and the second equivalent liquid crystal lens being maintained unchanged, the specific method in adjustment being similar to aforementioned method. By way of example, by taking the plurality of fourth sub-electrodes in the second electrode assembly as an example, in the direction from both sides towards the fourth central electrode, voltages may gradually be restored to be applied on edge electrodes in the plurality of fourth sub-electrodes. For example, if the specific number of the plurality of fourth sub-electrodes is seven, the specific number of fourth sub-electrodes currently being applied with voltages may be merely three. When the grayscales ascend from a lower level to a higher level, firstly, voltages are restored to be applied onto two of the fourth sub-electrodes both of which are most marginal ones not yet being applied with voltages in the plurality of fourth sub-electrodes, i.e., a condition in which voltages are merely applied onto three middle ones of the plurality of fourth sub-electrodes is turned into another condition in which voltages are applied onto five middle ones of the plurality of fourth sub-electrodes; and when the grayscales ascend once again, then voltages may continue to be restored gradually to be applied onto most marginal ones of the fourth sub-electrodes on which there are no voltages being applied yet, symmetrically from both sides towards the middle sequentially. And a condition in which the voltages are applied on the plurality of the second sub-electrodes in the first electrode assembly is consistent with the condition in which the voltages are applied on the plurality of the fourth sub-electrodes in the second electrode assembly as above.

It should be noticed that, the first equivalent liquid crystal lens and the second equivalent liquid crystal lens are controlled individually by the first electrode assembly and the second electrode assembly, respectively. Therefore, when the grayscales ascend, those skilled in the art may selectively adjust the first electrode assembly and/or the second electrode assembly in a flexible manner depending on practical conditions such as the grayscales practically displayed and the like, when the grayscales are being adjusted, it is just intended to adjust the equivalent width of the second equivalent liquid crystal lens without adjusting the equivalent width of the first equivalent liquid crystal lens. And in the embodiment of the disclosure, there are no restrictive requirements on specific number of the second sub-electrodes and/or the fourth sub-electrodes whose respective voltages are restored to be applied thereon in a single time, then those skilled in the art may set flexibly in this connection depending on practical requirements such as the condition of grayscales to be adjusted and the like, certainly an optimal option should be that the voltages may be restored to be applied symmetrically from both sides toward the middle. As such, an adjustment on different grayscales may be implemented, enhancing the light transmittance at each grayscale condition, and in turn improving the display quality of the display panel.

Method Two: Only adjusting the equivalent curvature(s) of the first equivalent liquid crystal lens and/or the second equivalent liquid crystal lens, with the equivalent widths of both the first equivalent liquid crystal lens and the second equivalent liquid crystal lens being maintained unchanged.

Figure 12:
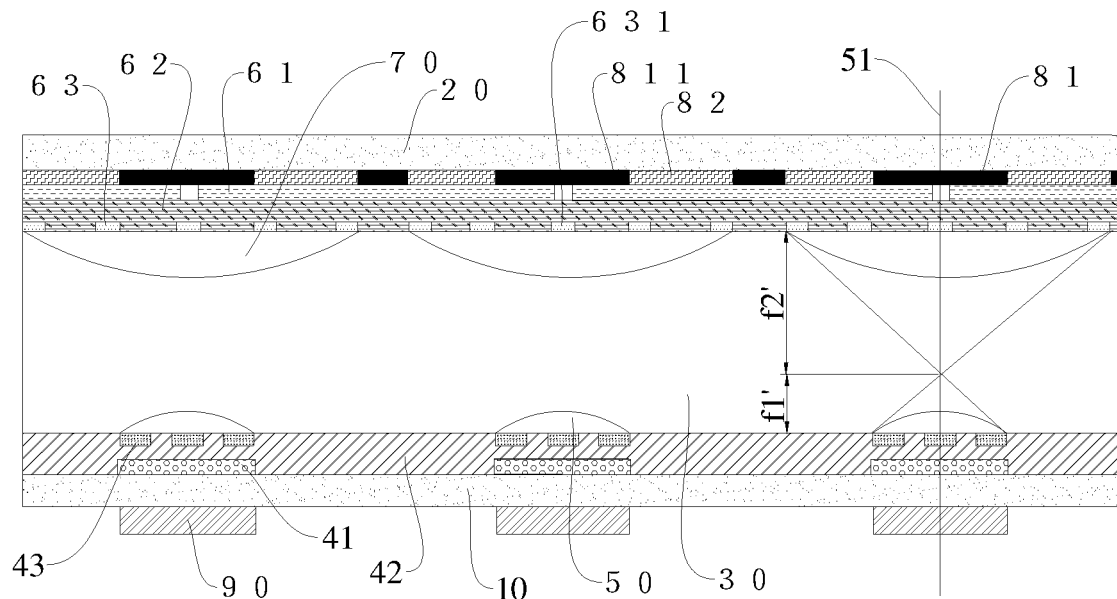
FIG. 12 illustrates a structural schematic view of further another display panel according to an embodiment of the disclosure.

Of course, at that time, when the equivalent curvature(s) of the first equivalent liquid crystal lens and/or the second equivalent liquid crystal lens may change, the respective focal point of one of the first equivalent liquid crystal lens and the second equivalent liquid crystal lens whose equivalent curvature may be changed may move in respective principal optical axis 51 or principal optical axis 71, with the focal points of both the first equivalent liquid crystal lens and the second equivalent liquid crystal lens still being maintained in coincidence with each other, the focal length of the first equivalent liquid crystal lens being f1' and the focal length of the second equivalent liquid crystal lens being f2'; and above changes may be implemented by adjusting the voltage value(s) of the first electrode assembly and/or the second electrode assembly. Specifically, as illustrated in FIG. 12, for example, when the grayscales of the display panel descend from a higher level to a lower level, by decreasing voltages of the plurality of second sub-electrodes and/or the plurality of fourth sub-electrodes, an increase margin in which the voltages of the plurality of second sub-electrodes and/or the plurality of fourth sub-electrodes increase sequentially and gradually from the middle to both sides respectively becomes smaller gradually, and the equivalent curvature(s) of the first equivalent liquid crystal lens and/or the second equivalent liquid crystal lens may in turn be adjusted to become smaller. And certainly an optimal option should be that the voltages of the first electrode assembly and/or the second electrode assembly may decrease symmetrically so as to ensure the symmetry of each of the first equivalent liquid crystal lens and the second equivalent liquid crystal lens. For example, the voltages of the plurality of (e.g., taken the number of five as an example) fourth sub-electrodes in the second electrode assembly may be set in a direction starting from one side towards the middle and then towards the opposite side to be 10V, 5V, 0V, 5V, 10V respectively; and if the grayscales of the display panel are decreased, then above voltage values may be decreased respectively to be 7V, 4V, 0V, 4V, 7V (the specific magnitude of the voltage values may be determined depending on desired grayscales).

And it may be understood by those skilled in the art that, on the contrary, when the grayscales ascend from a lower level to a higher level, specifically, by increasing voltages of the plurality of second sub-electrodes and/or the plurality of fourth sub-electrodes, an increase margin in which the voltages of the plurality of second sub-electrodes and/or the plurality of fourth sub-electrodes increase sequentially and gradually from the middle to both sides respectively becomes larger gradually, and the equivalent curvature(s) of the first equivalent liquid crystal lens and/or the second equivalent liquid crystal lens may in turn be adjusted to become larger, with the equivalent widths of both the first equivalent liquid crystal lens and the second equivalent liquid crystal lens being maintained unchanged, the specific method in adjustment being similar to aforementioned method, without repeating herein any more.

Figure 13:
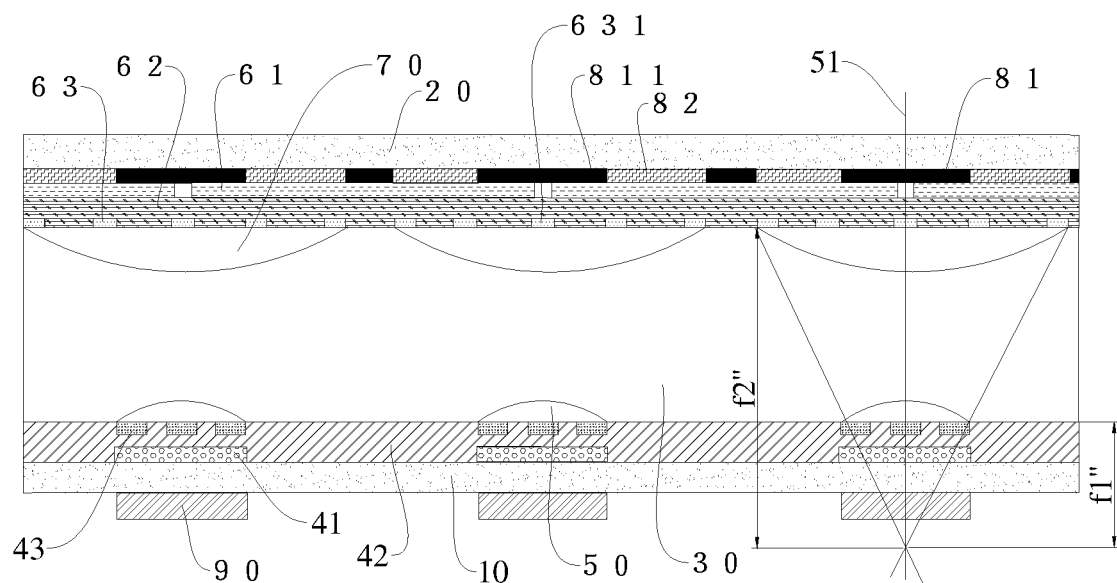
FIG. 13 illustrates a structural schematic view of further another display panel according to an embodiment of the disclosure.

According to an alternative embodiment, as illustrated in FIG. 13, when negative voltages are applied on the first electrode assembly, then the focal point of the first equivalent liquid crystal lens is a virtual focus formed at a side of the first equivalent liquid crystal lens away from the second equivalent liquid crystal lens, with the focal length of the first equivalent liquid crystal lens being f1" and the focal length of the second equivalent liquid crystal lens being f2", and with the method for adjusting the grayscale and relevant requirements on adjusting the grayscale being consistent with those mentioned as above, without repeating herein one by one.

In some other alternative embodiments, when the display state of the display panel is the dark state (i.e., the L0 state), there are two adjusting method, as follows.

Figure 14:
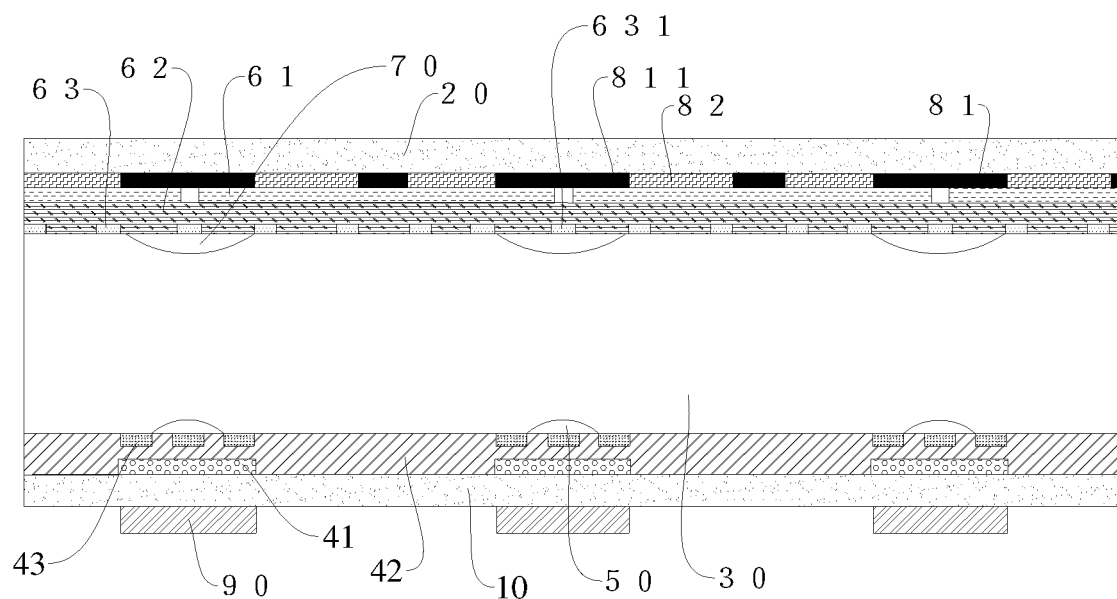
FIG. 14 illustrates a structural schematic view of another display panel according to an embodiment of the disclosure.

First adjusting method: as illustrated in FIG. 14, by adjusting the voltage values of the first electrode assembly and the second electrode assembly, the widths of the first equivalent liquid crystal lens and the second equivalent liquid crystal lens are adjusted, respectively, such that the orthographic projection of the central black matrix on the second substrate covers that equivalent orthographic projection of the second equivalent liquid crystal lens on the second substrate; as such, the light rays gathered or converged in the second equivalent liquid crystal lens may completely be incident onto the central black matrix, and in turn be absorbed thereby, so as to implement the dark state; or alternatively, voltages may not be applied onto the first electrode assembly and the second electrode assembly, i.e., neither the first equivalent liquid crystal lens nor the second equivalent liquid crystal lens may be formed, as illustrated in FIG. 8, the dark state may also be implemented thereby.

Second adjusting method: by decreasing the voltages of the first electrode assembly and the second electrode assembly, the equivalent curvatures of the first equivalent liquid crystal lens and the second equivalent liquid crystal lens are adjusted to become smaller, such that both the first equivalent liquid crystal lens and the second equivalent liquid crystal lens are transformed into an identical plane and then disappear, as illustrated in FIG. 8, then the dark state is also implemented.

There are several advantageous technical effects brought about by the technical solutions as provided in embodiments of the disclosure, as below:

As to the display panel as provided herein, by controlling the voltages of the first electrode assembly and the second electrode assembly individually, a control on both the first equivalent liquid crystal lens and the second equivalent liquid crystal lens may be implemented respectively, and the grayscale display of the display panel may be adjusted by using the first equivalent liquid crystal lens and the second equivalent liquid crystal lens instead of relevant polarizer(s), and in turn any influence by use of the polarizers on the light transmittance may be eliminated, i.e., the light transmittance at each grayscale in the display panel may be enhanced, and the image quality may be improved. Therefore, both the light transmittance and the image quality in the display panel may be enhanced, so as to obtain advantages such as relatively high light utilization efficiency, relatively fine image quality of display, and convenience in adjusting and increasing the grayscale and the like.

And similarly, the display device provided herein may have relatively high light utilization efficiency, relatively fine image quality of display, and bright colors. Of course, it may be understood by those skilled in the art that, the display device has all features and advantages of aforementioned display panel, without repeating herein in detail any more.

And as to the method for adjusting the grayscale of the display panel provided herein, by adjusting the equivalent curvatures of the first equivalent liquid crystal lens and the second equivalent liquid crystal lens respectively, an adjustment of the grayscales of the display panel may be implemented, such that the method is relatively simple, convenient and easy to be implemented.

In depiction of the embodiments of the disclosure, it should be comprehended that, any orientative or positional relationship indicated by terminologies "central", "longitudinal", "transverse", "length", "width", "thickness", "upper", "lower", "front", "back", "left", "right", "vertical", "horizontal", "top", "bottom", "inner", "outer" and so on is based on orientative or positional relationship as illustrated in accompanied drawings, only intending to facilitate and simplify depictions of embodiments of the disclosure, rather than indicating or implying that such referred device or element should necessarily have a specific orientation, or be constructed in a specific orientation or operate in a specific orientation, therefore, such terminologies should not be comprehended as limitations to embodiments of the disclosure.

Besides, terminologies "first", "second" may only intend to be used for depiction, rather than intending to be comprehended to indicate or imply relative importance or to indicate impliedly specific number of technical features as mentioned. Thereby, features defined by "first", "second" may comprise explicitly or impliedly one or more such features. In depictions of embodiments of the disclosure, an expression "a plurality of/the plurality of" means at least two, such as two, three, etc., unless it is defined otherwise definitely.

In embodiments of the disclosure, unless being explicitly specified and defined in the context otherwise, terminologies such as "mount", "connect", "connect(ed) . . . with", "fixed" and the like are intended to be inclusive and should thus be comprehended in a broad sense, e.g., may be interpreted as fixed connection or detachable connection, or even integrated; and may be a mechanical connection, or an electrical connection, or communication with each other or one another; and may be direct connection, or indirection connection via an intermediate medium, or an internal communication between two elements, or even an interaction relationship between two elements. As to those skilled in the art, specific meanings of above terminologies in embodiments of the disclosure may be comprehended according to specific context herein.

In embodiments of the disclosure, unless being explicitly specified and defined in the context otherwise, a first feature being "above" or "below" a second feature may contain meanings comprising: the first feature and the second feature being in direct contact; or the first feature and the second feature being in contact via another feature disposed therebetween, rather than being in direct contact. Moreover, the first feature being "above", "over" and "on" may contain a meaning of the first feature being directly/right over or inclined over the second feature, or may only represent that the first feature has a level (or a height from horizontal) higher/larger than that of the second feature. The first feature being "below", "under", "beneath" the second feature may contain a meaning of the first feature being directly/right under or inclined under the second feature, or may only represent that the first feature has a level (or a height from horizontal) lower/smaller than that of the second feature.

In depictions herein, description referring to terminologies such as "an embodiment", "embodiments", "example", "specific example" or "examples" may mean that specific feature(s), structure(s), material or characteristics in combination therewith may be contained within at least one embodiment or example of the disclosure. In the description, illustrative expressions concerning above terminologies may not necessarily refer to same embodiment(s)/example(s). Furthermore, specific feature(s), structure(s), material or characteristics as depicted may be combined mutually in any one or more of embodiments or examples appropriately. In addition, it may occur to those skilled to join and combine different embodiments or examples as depicted herein.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display panel, comprising:
   a first substrate and a second substrate provided opposite to each other; and
   a liquid crystal layer between the first substrate and the second substrate;
   wherein the display panel further comprises:
      at least a first electrode assembly, on a surface of the first substrate facing towards the liquid crystal layer, and configured to drive liquid crystal molecules in a first region of the liquid crystal layer abutting against the first electrode assembly to deflect to form a first equivalent liquid crystal lens having a first refractive-index distribution, the first equivalent liquid crystal lens having the same equivalent curvature, width, thickness, orthogonal projection and focus as those of a physical lens which also has the first refractive-index distribution and projects in a direction away from the first substrate; and
      at least a second electrode assembly, on a surface of the second substrate facing towards the liquid crystal layer, and configured to drive liquid crystal molecules in a second region of the liquid crystal layer abutting against the second electrode assembly to deflect to form a second equivalent liquid crystal lens having a second refractive-index distribution, the second equivalent liquid crystal lens having the same equivalent curvature, width, thickness, orthogonal projection and focus as those of another physical lens which also has the second refractive-index distribution and projects in a direction away from the second substrate; and wherein an equivalent orthographic projection of the second equivalent liquid crystal lens covers an equivalent orthographic projection of the first equivalent liquid crystal lens, on the first substrate, and an equivalent width of the first equivalent liquid crystal lens is smaller than that of the second equivalent liquid crystal lens;

wherein the liquid crystal layer is an integral continuous layer and fills between the first substrate and the second substrate.

2. The display panel according to claim 1, wherein the first region is a rectangular region abutting against a side of the first electrode assembly facing towards the second electrode assembly, within the liquid crystal layer; and the second region is another rectangular region abutting against a side of the second electrode assembly facing towards the first electrode assembly, within the liquid crystal layer; and wherein a width of the first region is set to be 1.2 times of a width of the first electrode assembly, and a width of the second region is set to be 1.2 times of a width of the second electrode assembly, and respective thicknesses of the first region and the second region are set to be ½ of a thickness of the liquid crystal layer.

3. The display panel according to claim 1, wherein a principal optical axis of the first equivalent liquid crystal lens and a principal optical axis of the second equivalent liquid crystal lens are arranged on one and the same straight line.

4. The display panel according to claim 3, wherein a focal point of the first equivalent liquid crystal lens and a focal point of the second equivalent liquid crystal lens coincide with each other.

5. The display panel according to claim 1, wherein a principal optical axis of the first equivalent liquid crystal lens and a principal optical axis of the second equivalent liquid crystal lens are perpendicular to the first substrate and the second substrate, respectively.

6. The display panel according to claim 1, wherein each of the first equivalent liquid crystal lens and the second equivalent liquid crystal lens is arranged symmetrically along a respective principal optical axis, individually.

7. The display panel according to claim 1, further comprising a color film layer between the second substrate and the second electrode assembly, the color film layer comprising:
   a black matrix defining a plurality of second openings spaced apart from one another; and
   a plurality of color filters spaced apart from one another and alternating between adjacent ones of the plurality of second openings, respectively;
   wherein at least one sub-black matrix is interposed within each of the plurality of color filters, dividing each of the plurality of color filters into an even number of sub-color filters having an identical color; and
   wherein an equivalent orthographic projection of the second equivalent liquid crystal lens on the second substrate covers an even number of sub-color filters having an identical color in each of the plurality of color filters.

8. The display panel according to claim 7, further comprising:
   collimators in a bar shape, in a region on one of a surface of the first substrate facing towards the liquid crystal layer and a surface of the first substrate facing away from the liquid crystal layer, the region being in alignment with the first electrode assembly or the first equivalent liquid crystal lens in a direction of a principal optical axis of the first equivalent liquid crystal lens,
   wherein one of the at least one sub-black matrix functions as a central black matrix which is most centrally located therein, in the middle of the even number of sub-color filters, and an orthographic projection of the central black matrix covers orthographic projections of the collimators on the first substrate.

9. The display panel according to claim 7, wherein the first electrode assembly comprises:
   a first sub-electrode disposed on the surface of the first substrate facing towards the liquid crystal layer;
   a first insulation layer which is also disposed on the surface of the first substrate facing towards the liquid crystal layer and covers the first sub-electrode; and
   a plurality of second sub-electrodes on a surface of the first insulation layer abutting against the liquid crystal layer, an orthographic projection of the first sub-electrode covering orthographic projections of the plurality of second sub-electrodes on the first substrate, and
   wherein the second electrode assembly comprises:
   a third sub-electrode disposed on the surface of the second substrate facing towards the liquid crystal layer;
   a second insulation layer which is also disposed on the surface of the second substrate facing towards the liquid crystal layer and covers the third sub-electrode; and
   a plurality of fourth sub-electrodes on a surface of the second insulation layer abutting against the liquid crystal layer, an orthographic projection of the third sub-electrode covering orthographic projections of the plurality of fourth sub-electrodes on the second substrate.

10. The display panel according to claim 9, wherein there are an odd number of the plurality of second sub-electrodes and also an odd number of the plurality of fourth sub-electrodes, respectively.

11. The display panel according to claim 10, wherein the third sub-electrode is provided with at least one first opening, and an orthographic projection of a fourth central electrode which functions as a middlemost one of the plurality of fourth sub-electrodes covers an orthographic projection of the first opening on the second substrate; and
   wherein in response to voltages being applied respectively to the third sub-electrode and the plurality of fourth sub-electrodes of the second electrode assembly, an edge electric field is formed between others of the plurality of fourth sub-electrodes which are located nearest to the fourth central electrode at both sides thereof and edges of the third sub-electrode defining the first opening.

12. The display panel according to claim 11, wherein a width of the first opening is ⅒ to ⅘ of a width of the fourth central electrode.

13. The display panel according to claim 12,
   wherein one of the at least one sub-black matrix functions as a central black matrix which is most centrally located therein, in the middle of the even number of sub-color filters, and an orthographic projection of the central black matrix covers orthographic projections of the collimators on the first substrate.

14. The display panel according to claim 1, wherein an equivalent width of the second equivalent liquid crystal lens is 3 to 6 times of an equivalent width of the first equivalent liquid crystal lens.

15. A display device comprising: the display panel according to claim 1, and a housing inside which the display panel is accommodated.

16. A method for adjusting a grayscale of the display panel according to claim 1, by adjusting a curvature of at least one of the first equivalent liquid crystal lens and the second equivalent liquid crystal lens, the method comprising:

applying voltages on the first electrode assembly and the second electrode assembly to induce an increase in equivalent curvature of at least one of the first equivalent liquid crystal lens and the second equivalent liquid crystal lens in response to an ascending change of the grayscale of the display panel, with the focal point of the first equivalent liquid crystal lens being maintained in coincidence with the focal point of the second equivalent liquid crystal lens; and to induce a decrease in equivalent curvature of at least one of the first equivalent liquid crystal lens and the second equivalent liquid crystal lens in response to a descending change of the grayscale of the display panel, with the focal point of the first equivalent liquid crystal lens being maintained in coincidence with the focal point of the second equivalent liquid crystal lens.

17. The method according to claim 16, wherein a voltage of a second central electrode which functions as a middlemost one of the plurality of second sub-electrodes is equal to a voltage of the first sub-electrode, and a voltage of a fourth central electrode which functions as a middlemost one of the plurality of fourth sub-electrodes is equal to a voltage of the third sub-electrode, and voltages of the plurality of second sub-electrodes and voltages of the plurality of fourth sub-electrodes increase sequentially from the middle to both sides, respectively; and wherein an increase margin in which the voltages of the plurality of second sub-electrodes and/or the plurality of fourth sub-electrodes increase sequentially from the middle to both sides becomes larger gradually, in response to the an ascending change of the grayscale of the display panel; and the increase margin in which the voltages of the plurality of second sub-electrodes and/or the plurality of fourth sub-electrodes increase sequentially from the middle to both sides becomes smaller gradually, in response to the descending change of the grayscale of the display panel.

18. The method according to claim 16, wherein the respective equivalent width of at least one of the first equivalent liquid crystal lens and the second equivalent liquid crystal lens is adjusted, and the respective equivalent curvature of at least one of the first equivalent liquid crystal lens and the equivalent liquid crystal second equivalent liquid crystal lens is also adjusted, with the focal points of the first equivalent liquid crystal lens and the second equivalent liquid crystal lens being maintained unchanged, and wherein adjustments of both the respective equivalent width and the respective equivalent curvature are implemented by adjusting respective voltage value of at least one of the first electrode assembly and the second electrode assembly.

19. The method according to claim 16, wherein only equivalent curvatures of both the first equivalent liquid crystal lens and the second equivalent liquid crystal lens are adjusted, with equivalent widths of both the first equivalent liquid crystal lens and the second equivalent liquid crystal lens being maintained unchanged, such that in response to a change in at least one of the equivalent curvatures of the first equivalent liquid crystal lens and the second equivalent liquid crystal lens, at least one of the respective equivalent focal points of the first equivalent liquid crystal lens and the second equivalent liquid crystal lens moves in respective principal optical axis, with equivalent focal points of both the first equivalent liquid crystal lens and the second equivalent liquid crystal lens still being maintained in coincidence with each other.

20. The method according to claim 17, wherein a voltage of the second central electrode is equal to that of the fourth central electrode.

* * * * *